United States Patent
Oh et al.

(10) Patent No.: US 11,765,770 B2
(45) Date of Patent: Sep. 19, 2023

(54) METHOD AND DEVICE FOR RADIO RESOURCE ALLOCATION IN WIRELESS COMMUNICATION SYSTEM

(71) Applicant: Samsung Electronics Co., Ltd., Suwon-si (KR)

(72) Inventors: Jinyoung Oh, Suwon-si (KR); Hyunseok Ryu, Suwon-si (KR); Sungjin Park, Suwon-si (KR); Jonghyun Bang, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/466,232

(22) Filed: Sep. 3, 2021

(65) Prior Publication Data
US 2021/0400719 A1    Dec. 23, 2021

Related U.S. Application Data

(63) Continuation of application No. 16/673,190, filed on Nov. 4, 2019, now Pat. No. 11,116,008.

(30) Foreign Application Priority Data

Nov. 2, 2018 (KR) .................. 10-2018-0133943
Jul. 18, 2019 (KR) .................. 10-2019-0086910

(51) Int. Cl.
*H04W 74/08* (2009.01)
*H04L 1/1607* (2023.01)
*H04W 72/23* (2023.01)

(52) U.S. Cl.
CPC ....... *H04W 74/0808* (2013.01); *H04L 1/1614* (2013.01); *H04W 72/23* (2023.01)

(58) Field of Classification Search
CPC .......... H04W 72/0453; H04W 72/042; H04W 74/0808; H04W 24/08; H04W 28/06;
(Continued)

(56) References Cited

U.S. PATENT DOCUMENTS 11,116,008 B2 *  9/2021  Oh ...................... H04W 72/23
2019/0141734 A1 *  5/2019  Lei ................... H04W 72/0453
(Continued)

FOREIGN PATENT DOCUMENTS

| KR | 10-2020-0009911 A | 1/2020 |
| WO | 2016/123402 A1 | 8/2016 |
| WO | 2017/126936 A1 | 7/2017 |

OTHER PUBLICATIONS

International Search Report dated Feb. 20, 2020, issued in an International Application No. PCT/KR2019/014846.
LG Electronics; Channel access procedure for NR unlicensed operation; 3GPP TSG RAN WG1 Meeting #94; R1-1808507; Aug. 24, 2018; Gothenburg, Sweden.
(Continued)

*Primary Examiner* — Kashif Siddiqui
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). An operation method of a base station in a radio communication system and an apparatus therefor are provided. The operation method includes transmitting, to a terminal, configuration information including a configuration of a bandwidth part in an unlicensed spectrum, the bandwidth part including a plurality of subbands, performing a channel access procedure for each of the plurality of subbands included in the bandwidth part, initiating channel access via at least one subband, among the plurality of subbands, determined to be
(Continued)

an idle channel according to a result of the channel access procedure, transmitting, to the terminal, the result of the channel access procedure for each subband, among the plurality of subbands, and transmitting, to the terminal, a data channel according to the result of the channel access procedure for each subband, among the plurality of subbands.

20 Claims, 21 Drawing Sheets

(58) Field of Classification Search
CPC ............ H04W 72/00; H04W 72/0406; H04W 72/044; H04W 72/08; H04W 72/12; H04W 72/1273; H04W 72/1289; H04W 72/14; H04W 74/002; H04W 74/006; H04W 80/08; H04L 1/0038; H04L 5/0007; H04L 5/0094; H04L 1/001; H04L 41/0896; H04L 5/001; H04L 5/003; H04L 5/0044; H04L 5/0053; H04L 5/0098

See application file for complete search history.

(56) References Cited

U.S. PATENT DOCUMENTS

| | | | |
|---|---|---|---|
| 2020/0045696 A1* | 2/2020 | Huang | H04W 72/23 |
| 2020/0112484 A1* | 4/2020 | Sun | H04W 72/20 |
| 2020/0154475 A1* | 5/2020 | Pao | H04W 74/0808 |
| 2020/0329496 A1* | 10/2020 | Li | H04W 72/0453 |

OTHER PUBLICATIONS

Huawei, HiSilicon; Coexistence and channel access for NR unlicensed band operations; 3GPP TSG RAN WG1 Meeting #94; R1-1808061; Aug. 24, 2018; Gothenburg, Sweden.

LG Electronics; Discussion on configured grant for NR unlicensed operation; 3GPP TSG RAN WG1 Meeting #94bis; R1-1810272; Oct. 12, 2018; Chengdu, China.

LG Electronics; Frame structure for NR unlicensed operation; 3GPP TSG RAN WG1 Meeting #94bis; R1-1810266 Oct. 12, 2018; Chengdu, China.

Extended European Search Report dated Dec. 7, 2021, issued in a counterpart European Application No. 19878910.9-1215.

European Office Action dated Mar. 22, 2023, issued in European Patent Application No. 19878910.9.

* cited by examiner

METHOD AND DEVICE FOR RADIO RESOURCE ALLOCATION IN WIRELESS COMMUNICATION SYSTEM

CROSS-REFERENCE TO RELATED APPLICATION(S)

This application is a continuation application of prior application Ser. No. 16/673,190, filed on Nov. 4, 2019, which will be issued as U.S. Pat. No. 11,116,008 on Sep. 7, 2021, which is based on and claimed priority under 35 U.S.C. § 119 of a Korean patent application number 10-2018-0133943, filed on Nov. 2, 2018, in the Korean Intellectual Property Office and of a Korean patent application number 10-2019-0086910, filed on Jul. 18, 2019, in the Korean Intellectual Property Office, the disclosure of each of which is incorporated by reference herein in its entirety.

BACKGROUND

1. Field

The disclosure relates to a radio communication system. More particularly, the disclosure relates to a method and device for radio resource allocation in a radio communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is evolving from a human-centered connection network, where humans create and consume information, to the Internet of Things (IoT), in which information is exchanged between distributed components, that is, "things", and processed. Internet-of-Everything (IoE) technology, in which a big-data processing technology is combined with IoT technology through a connection with a cloud server or the like, has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create new value in human lives may be provided. The IoT may be applied to fields such as those of a smart home, smart building, smart city, smart car, connected car, smart grid, health care, smart home appliance, or high-tech medical service, through the convergence of the Information Technology (IT) of the related art and various industries.

Accordingly, various attempts to apply 5G communication to the IoT are being made. For example, 5G communication technology, such as a sensor network, machine-to-machine (M2M) communication, and machine-type communication (MTC), has been implemented using techniques such as beamforming, MIMO, and array antennas. The application of a cloud RAN as big-data processing technology is an example of convergence of the 5G technology and the IoT technology.

Since various services can be provided in accordance with the above-described development of the wireless communication system, a method for smoothly providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for radio resource allocation in a radio communication system.

Another aspect of the disclosure is to provide a device and method for performing a channel access procedure in an unlicensed spectrum.

Another aspect of the disclosure is to provide a device and method for performing a channel access procedure for each subband of a bandwidth part in an unlicensed spectrum.

Additional aspects will be set forth in part in the description which follows and, in part, will be apparent from the description, or may be learned by practice of the presented embodiments.

In accordance with an aspect of the disclosure, an operation method of a base station in a radio communication system is provided. The operation method includes transmitting, to a terminal, configuration information including a configuration of a bandwidth part in an unlicensed spectrum, the bandwidth part including a plurality of subbands, performing a channel access procedure for each of the plurality of subbands included in the bandwidth part, initiating channel access via at least one subband, among the plurality of subbands, determined to be an idle channel according to a result of the channel access procedure, transmitting, to the terminal, the result of the channel access procedure for each subband of the plurality of subbands, and transmitting, to the terminal, a data channel according to the result of the channel access procedure for each subband of the plurality of subbands.

In accordance with another aspect of the disclosure, an operation method of a terminal in a radio communication system is provided. The operation method includes receiving configuration information including a configuration of a bandwidth part from a base station in an unlicensed spectrum, the bandwidth part including a plurality of subbands, receiving a channel access result for each of the plurality of subbands included in the bandwidth part from the base station, receiving, from the base station, downlink control information (DCI) for scheduling of uplink/downlink data channel transmission/reception, and performing uplink data channel transmission/reception according to the scheduling of the of the uplink/downlink data channel transmission/reception.

In accordance with another aspect of the disclosure, a device of a base station in a radio communication system is provided. The device includes a transceiver, and at least one processor configured to control the transceiver to transmit to a terminal, configuration information including a configuration of a bandwidth part in an unlicensed spectrum, the bandwidth part including a plurality of subbands, perform a channel access procedure for each of the plurality of subbands included in the bandwidth part, initiate channel access via at least one subband determined to be an idle channel according to a result of the channel access procedure, control the transceiver to transmit to the terminal, the result of the channel access procedure for each subband of the plurality of subbands, and control the transceiver to transmit to the terminal, a data channel according to the result of the channel access procedure for each subband of the plurality of subbands.

In accordance with another aspect of the disclosure, a device of a terminal in a radio communication system is provided. The device includes a transceiver, and at least one processor configured to control the transceiver to receive configuration information including a configuration of a bandwidth part from a base station in an unlicensed spectrum, receives a channel access result for each subband of a bandwidth part from the base station, the bandwidth part including a plurality of subbands, control the transceiver to receive from the base station, downlink control information (DCI) for scheduling of uplink/downlink data channel transmission/reception, and control the transceiver to perform uplink data channel transmission/reception according to the scheduling of the uplink/downlink data channel transmission/reception.

In accordance with another aspect of the disclosure, a device and method are provided. The method includes enabling communication to be efficiently performed in an unlicensed spectrum by providing, by a base station, a terminal with notification of a result of a channel access procedure for each subband of a bandwidth part in the unlicensed spectrum.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
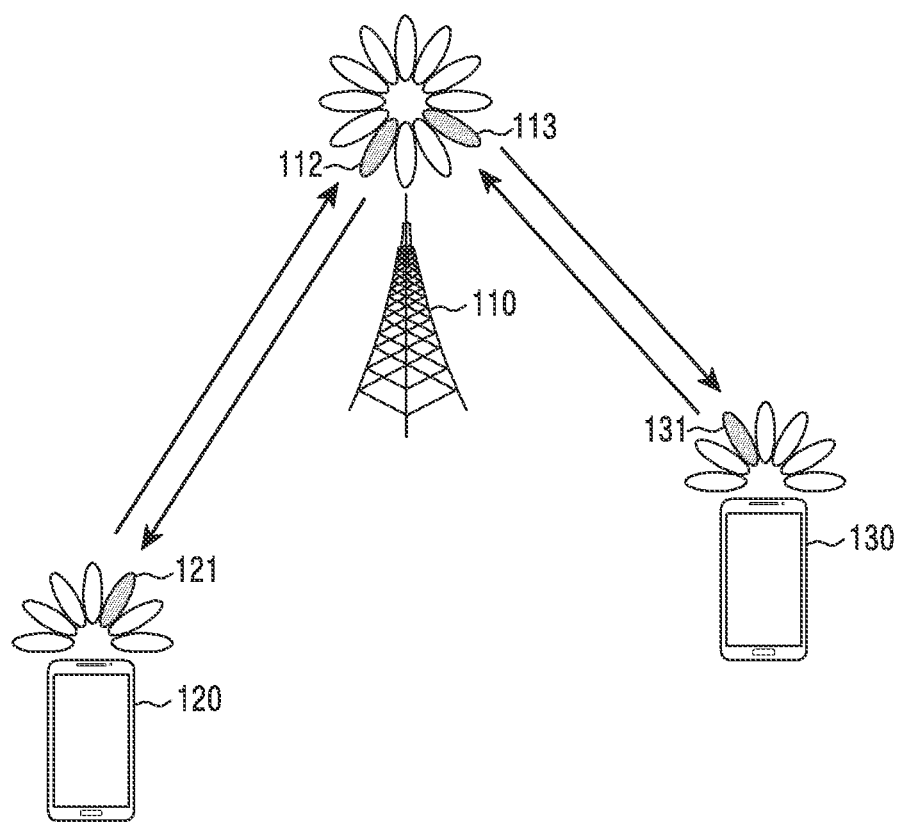
FIG. 1 illustrates a radio communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of the disclosure will be described in detail with reference to the accompanying drawings.

In describing the embodiments, descriptions of technologies which are already known to those skilled in the art and are not directly related to the disclosure may be omitted. Such omission of unnecessary descriptions is intended to prevent obscuring the main idea of the disclosure and more clearly convey the main idea.

For the same reason, in the accompanying drawings, some elements may be exaggerated, omitted, or schematically illustrated. Further, the size of each element does not entirely reflect the actual size. In the drawings, identical or corresponding elements are indicated by identical reference numerals.

The advantages and features of the disclosure and ways to achieve them will be made apparent with reference to the embodiments described below in detail in conjunction with the accompanying drawings. However, the disclosure is not limited to the embodiments set forth below, and may be implemented in various different forms. The following embodiments are provided only to completely disclose the disclosure and inform those skilled in the art of the scope of the disclosure, and the disclosure is defined only by the scope of the appended claims. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special-purpose computer, or other programmable data-processing device to produce a machine, such that the instructions, executed via the processor of the computer or other programmable data-processing device, create means for implementing the functions specified in the flowchart block or blocks. These computer program instructions may also be stored in a computer-usable or computer-readable memory that can direct a computer or other programmable data-processing device to function in a particular manner, such that the instructions stored in the computer-usable or computer-readable memory produce an article of manufacture including instruction means that implement the function specified in the flowchart block or blocks. The computer program instructions may also be loaded onto a computer or other programmable data-processing device to cause a series of operations to be performed on the computer or other programmable device to produce a computer-implemented process such that the instructions that execute on the computer or other programmable device provide operations for implementing the functions specified in the flowchart block or blocks.

Further, each block of the flowchart illustrations may represent a module, segment, or part of a code, which includes one or more executable instructions for implementing the specified logical function(s). It should also be noted that the functions noted in the blocks may occur out of the order in some alternative implementations. For example, two blocks shown in succession may in fact be executed substantially concurrently, or the blocks may sometimes be executed in the reverse order, depending upon the functionality involved.

As used herein, "-unit" refers to a software element or a hardware element, such as a field-programmable gate array (FPGA) or an application-specific integrated circuit (ASIC), which performs a predetermined function. However, "unit" does not always have a meaning limited to software or hardware. A "-unit" may be configured either to be stored in an addressable storage medium or to execute on one or more processors. Therefore, the "-unit" includes, for example, software elements, object-oriented software elements (or objects), class elements and task elements, processes, functions, properties, procedures, subroutines, segments of program code, drivers, firmware, micro-code, circuits, data, databases, data structures, tables, arrays, and parameters. Elements and functions provided by the "-unit" may be either combined into a smaller number of elements and "-units" or divided into a larger number of elements and "-units". Moreover, the elements and "-units" may be implemented to be executed on one or more CPUs within a device or a security multimedia card. Also, in an embodiment, the '~ unit' may include one or more processors.

In the 5G (5th-generation) system, support for various services beyond the existing 4G (4th-generation) system is being considered. For example, 5G system services may include an enhanced mobile broadband (eMBB) communication service, an ultra-reliable and low latency communication (URLLC) service, a massive device-to-device communication (mMTC: massive machine-type communication) service, and a next-generation broadcast service (eMBMS: evolved multimedia broadcast/multicast Service). The 5G system services described above are exemplary, and possible services of the 5G system are not limited to the examples described above. A system providing the URLLC service may be referred to as a URLLC system, and a system providing the eMBB service may be referred to as an eMBB system. The terms "service" and "system" may be used interchangeably.

As described above, a plurality of services may be provided to a user in a communication system. In order to provide a plurality of services to a user, a method capable of providing a user with each service according to characteristics within the same time interval and a device using the method are required.

In a radio communication system, for example, a long-term evolution (LTE) system, an LTE-advanced (LTE-A) system, or a 5G new radio (NR) system, it may be configured that a base station transmits, to a terminal, downlink control information (DCI) including resource allocation information for transmission of a downlink signal through a downlink control channel (physical downlink control channel (PDCCH)), and the terminal receives at least one downlink signal of the downlink control information (e.g., a channel-state information reference signal (CSI-RS)), a broadcast channel (physical broadcast channel (PBCH), or a downlink data channel (physical downlink shared channel (PDSCH)).

For example, the base station may transmit, in subframe n to the terminal, downlink control information (DCI) indicating to receive PDSCH in subframe n through PDCCH, and the terminal having received the downlink control information (DCI) may receive PDSCH in subframe n according to the received downlink control information.

In an LTE, LTE-A, or NR system, it may configured that the base station transmits downlink control information (DCI) including uplink resource allocation information to the terminal through a downlink control channel (PDCCH), and the terminal transmits, to the base station, at least one uplink signal of uplink control information (e.g., a sounding reference signal (SRS), the uplink control information (UCI), a physical random access channel (PRACH)), or an uplink data channel (physical uplink shared channel (PUSCH)).

For example, the terminal, having received, in subframe n, configuration information (or uplink (UL) grant or DCI including resource allocation into for uplink transmission) for uplink transmission performed through PDCCH from the base station, may perform uplink data channel transmission (hereinafter, PUSCH transmission) according to a time (e.g., n+k) configured via a higher-layer signal (or higher layer signaling. In the disclosure, a higher signal may be used as having the same meaning as higher layer signaling), or transmission time indicator information (e.g., n+k) of an uplink signal, which is included in the configuration information for uplink transmission.

If configured downlink transmission is transmitted from the base station to the terminal through an unlicensed spectrum, or when configured uplink transmission is performed from the terminal to the base station through an unlicensed spectrum, a communication device (e.g., the base station or terminal) may perform a channel access procedure (or listen-before talk (LBT)) for the unlicensed spectrum, in which signal transmission is configured before or immediately before a configured signal transmission start time, and when the unlicensed spectrum is determined to be in an idle state according to the result of the channel access procedure, the communication device may access the unlicensed spectrum to perform configured signal transmission. Likewise, in various embodiments, the channel access procedure or LBT may include a procedure to determine, by the terminal or the base station, whether a channel of the unlicensed spectrum is in the idle state or is occupied.

If it is determined, according to the channel access procedure performed by the communication device, that the unlicensed spectrum is not in the idle state or is in an occupied state, the communication device is able to access the unlicensed spectrum so that the communication device may not be able to perform configured signal transmission. For the channel access procedure in the unlicensed spectrum, in which signal transmission is configured, the communication device may receive a signal in the unlicensed spectrum for a predetermined time or a time period (e.g., a time calculated on the basis of at least one random value selected by the base station or the terminal) calculated according to a predefined rule, and may compare the intensity of the received signal with a predefined threshold value or a threshold value calculated according to a function represented by at least one parameter among a channel bandwidth or a signal bandwidth, in which a signal to be transmitted is transmitted, an intensity of transmission power, and a beam width of the transmission signal, so as to determine the idle state of the unlicensed spectrum.

For example, when the intensity of a signal received by the communication device in the unlicensed spectrum during 25 μs is less than a predefined threshold value of −72 dBm, the communication device may determine that the unlicensed spectrum is in the idle state, and may perform configured signal transmission in the unlicensed spectrum. The maximum available time for signal transmission may be restricted depending on a maximum channel occupancy time in the unlicensed spectrum, which is defined by each country or region, or a communication device type (e.g., a base station or a terminal, or a master device or a slave device). For example, in the case of Japan, in an unlicensed spectrum of 5 GHz, a base station or a terminal may perform a channel access procedure to occupy a channel in an idle state, and then may occupy the channel for up to 4 ms without performing an additional channel access procedure to transmit a signal. If the intensity of the signal received for 25 μs is greater than the predefined threshold value of −72 dBm, the communication device may determine that the unlicensed spectrum is not in the idle state, and may not transmit a signal.

In the case of the 5G communication system, various technologies, such as a technology enabling transmission of an uplink signal without uplink scheduling information (e.g., grant-free uplink transmission) and retransmission in units of code block groups (CBGs), will be introduced to provide various services and support a high data transmission rate. Therefore, when a communication device is to perform 5G communication via an unlicensed spectrum, a more efficient channel access procedure that takes into consideration various parameters is necessary.

A wireless communication system has developed beyond the initially provided voice-based service into a broadband radio communication system that provides high-speed and high-quality packet data service using communication standards such as high-speed packet access (HSPA) of 3rd-Generation Partnership Project (3GPP), long-term evolution (LTE) or evolved universal terrestrial radio access (E-UTRA), LTE-advanced (LTE-A), high-rate packet data (HRPD) of 3GPP2, ultra-mobile broadband (UMB), and 802.16e of Institute of Electrical and Electronics Engineers (IEEE), or the like. Also, communication standards of 5G or new radio (NR) are being developed as a 5G wireless communication system.

Accordingly, in the radio communication system including 5G, at least one service among enhanced mobile broadband (eMBB), massive machine-type communications (mMTC), and ultra-reliable and low-latency communications (URLLC) may be provided to a terminal. The services described above may be provided to the same terminal during the same time interval. In an embodiment, eMBB may be a service aimed at high-speed transmission of large amounts of data, mMTC may be a service aimed at minimizing terminal power and accessing multiple terminals, and URLLC may be a service aimed at high reliability and low latency, but eMBB, mMTC, and URLLC are not limited thereto. The three services may be major components of an LTE system or a post-LTE system, such as 5G/new radio or next radio (NR) but are not limited thereto.

Hereinafter, a base station is a subject that performs resource allocation to the terminal, and may include at least one of an eNodeB, a NodeB, a base station (BS), a radio access unit, a base station controller, or a node on a network. A terminal may include at least one of a user equipment (UE), a mobile station (MS), a cellular phone, a smart phone, a computer, or a multimedia system capable of performing a communication function. In the disclosure, a downlink (DL) is a radio transmission path of a signal transmitted from a base station to a terminal, and an uplink (UL) means a radio transmission path of a signal transmitted from a terminal to a base station. Further, hereinafter, an embodiment will be described as an example of an LTE or LTE-A system, and the terms "signal" and "physical channel" in an LTE or LTE-A system of the related art may be used to describe the method and device proposed by the disclosure. An embodiment of the disclosure may also be applied to other communication systems having a technical background or channel form similar to those of the mobile communication system described in the disclosure. For example, a 5th-generation mobile communication technology (5G and new radio (NR)) to be developed after LTE-A may be included. Further, an embodiment of the disclosure may be applied to other communication systems via some modifications without departing from the scope of the disclosure, as determined by those skilled in the art.

As a representative example of a broadband wireless communication system, an NR system employs an orthogonal frequency-division multiplexing (OFDM) scheme in a downlink (DL), and employs both OFDM and single-carrier frequency-division multiple access (SC-FDMA) schemes in an uplink (UL). In a multiple access scheme, data or control information of each user may be distinguished by allocating and operating time-frequency resources, at which data or control information of each user is transmitted, so as not to overlap each other, that is, to establish orthogonality.

When decoding fails upon initial transmission, an NR system employs a hybrid automatic repeat request (HARQ) scheme that retransmits corresponding data in a physical layer. In the HARQ scheme, when a receiver fails to correctly decode the data, the receiver transmits negative acknowledgement (NACK) informing a transmitter of decoding failure by the receiver so as to enable the transmitter to retransmit the data in a physical layer. The receiver may improve data reception performance by combining the data retransmitted by the transmitter with the data, decoding of which has previously failed. Further, in the HARQ scheme, when the receiver correctly decodes the data, information (ACK; Acknowledgment) indicating success of decoding may be transmitted to the transmitter so as to allow the transmitter to transmit new data.

Hereinafter, the disclosure describes a method and device for radio resource allocation in an unlicensed spectrum. More specifically, the disclosure provides a method and device for, in a radio communication system, particularly a system including a node that transmits an uplink signal or a node that receives a downlink signal using a broadband frequency in an unlicensed spectrum, dividing a broadband frequency band into subbands to perform a channel access procedure for each subband, and when some or all of the subbands are determined to be in the idle state according to the result of the channel access procedure, transmitting the downlink or uplink signal via the subbands determined to be in the idle state. The base station or terminal that transmits the signal may transmit, to the terminal or base station, information on the subbands in the broadband frequency band, which are determined to be in the idle state via the channel access procedure, for example, the result of the channel access procedure for each subband, and the terminal or base station, having received the same, may correctly receive the downlink or uplink signal using the result of the channel access procedure. In various embodiments, information indicating the result of the channel access procedure for each subband may be referred to as "LBT result information". In other words, the LBT result information may be defined for each subband, and may include information indicating the result of the channel access procedure for each subband. In addition, the LBT result information may be defined for each carrier or cell, and may include information indicating a result of the channel access procedure for each carrier or cell. Further, when a carrier or a cell includes a plurality of subbands, the LBT result information may be defined for each subband and each carrier or cell, and may include information indicating results of channel access procedures for each subband and each carrier or cell.

Hereinafter, terms referring to a signal to be used, terms referring to a channel, terms referring to control information, terms referring to network entities, terms referring to elements of a device, and the like are illustrated for convenience of explanation. Accordingly, the disclosure is not limited to the following terms, and other terms having the same technical meaning may be used.

The disclosure describes various embodiments using terms used in some communication specifications (e.g., 3rd-Generation Partnership Project (3GPP)), but this is merely illustrative. Various embodiments may also be easily modified and applied to other communication systems.

FIG. 1 illustrates a radio communication system according to an embodiment of the disclosure.

FIG. 1 illustrates a base station 110, a terminal 120, and a terminal 130, as some of the nodes using a wireless channel in a radio communication system. FIG. 1 illustrates only one base station, but may further include another base station that is the same as or similar to the base station 110.

Referring to FIG. 1, the base station 110 is a network infrastructure that provides wireless access to the terminals 120 and 130. The base station 110 has coverage defined as a predetermined geographic area on the basis of the distance over which a signal can be transmitted. The base station 110 may be referred to as, in addition to a base station, an "access point (AP)", an "eNodeB (eNB)", a "gNodeB (gNB)", a "5th generation (5G) node", a "wireless point", a "transmission/reception point (TRP)", or other terms having equivalent technical meanings.

Each of the terminal 120 and the terminal 130 is a device used by a user, and performs communication with the base station 110 via the wireless channel. In some cases, at least one of the terminal 120 and the terminal 130 may be operated without involvement of a user. That is, at least one of the terminal 120 and the terminal 130 is a device that performs machine-type communication (MTC) and is not carried by a user. In addition to "terminal", each of the terminal 120 and the terminal 130 may be referred to as a "user equipment (UE)", a "mobile station", a "subscriber station", a "remote terminal", a "wireless terminal", a "user device", or other terms having equivalent technical meanings.

The base station 110, the terminal 120, and the terminal 130 may transmit and receive wireless signals in a millimeter wave band (e.g., 28 GHz, 30 GHz, 38 GHz, and 60 GHz). At this time, in order to improve channel gain, the base station 110, the terminal 120, and the terminal 130 may perform beamforming. The beamforming may include transmission beamforming and reception beamforming That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in a quasi co-located (QCL) relationship with resources at which the serving beams 112, 113, 121, and 131 are transmitted.

Figure 2:
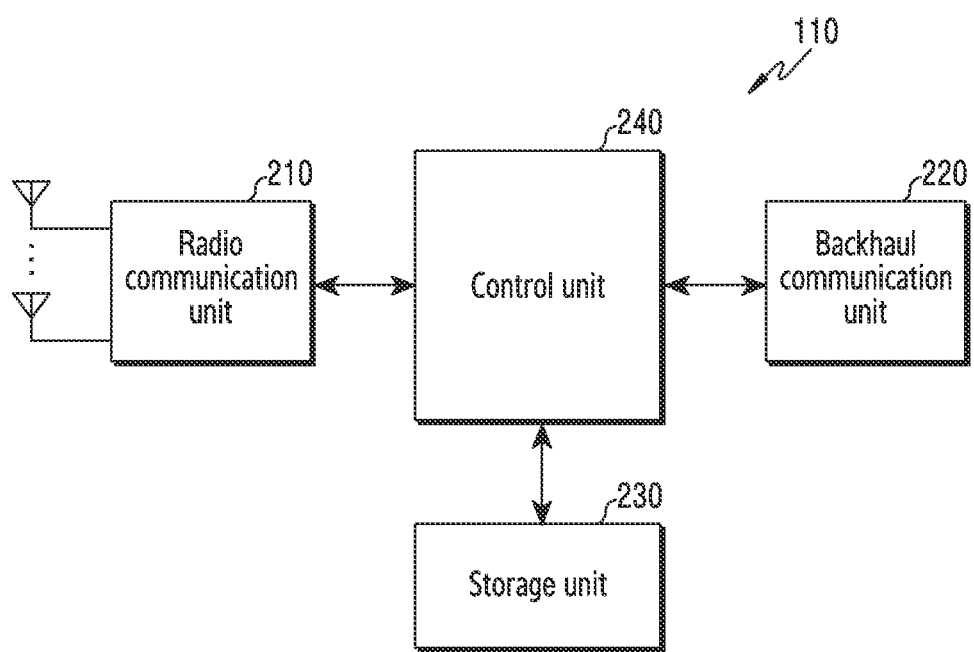
FIG. 2 illustrates the configuration of a base station in the radio communication system according to an embodiment of the disclosure.

FIG. 2 illustrates the configuration of a base station in the radio communication system according to an embodiment of the disclosure.

The configuration illustrated in FIG. 2 may be understood as the configuration of the base station 110. The term "-unit" or "-er" used hereinafter may refer to a unit that processes at least one function or operation, and may be implemented in hardware, software, or a combination of hardware and software.

Referring to FIG. 2, the base station includes a radio communication unit 210 (e.g., a transceiver), a backhaul communication unit 220, a storage unit 230, and a control unit 240 (e.g., at least one processor).

The radio communication unit 210 performs functions to transmit or receive a signal through a radio channel. For example, the radio communication unit 210 performs a function of conversion between a baseband signal and a bit stream according to a physical layer standard of a system. For example, when data is transmitted, the radio communication unit 210 generates complex symbols by encoding and modulating a transmission bit stream. Also, when data is received, the radio communication unit 210 restores a reception bit stream by demodulating and decoding a baseband signal.

Also, the radio communication unit 210 up-converts a baseband signal into an RF band signal and transmits the same through an antenna, and down-converts an RF band signal received through an antenna into a baseband signal. To this end, the radio communication unit 210 may include a transmission filter, a reception filter, an amplifier, a mixer, an oscillator, a Digital-to-Analog Convertor (DAC), an Analog-to-Digital Convertor (ADC), and the like. Also, the radio communication unit 210 may include multiple transmission/reception paths. Further, the radio communication unit 210 may include at least one antenna array including multiple antenna elements.

In terms of hardware, the radio communication unit 210 may include a digital unit and an analog unit, wherein the analog unit includes multiple sub-units according to an operating power, an operating frequency, and the like. The digital unit may be implemented as at least one processor (e.g., a Digital Signal Processor (DSP)).

The radio communication unit 210 transmits and receives a signal as described above. Accordingly, all or a part of the radio communication unit 210 may be referred to as a "transmission unit", a "reception unit", or a "transmission/reception unit". Transmission and reception performed through a radio channel, which will be described in the following descriptions, may be understood to mean that the above-described processing is performed by the radio communication unit 210.

The backhaul communication unit 220 provides an interface for communicating with other nodes within the network. That is, the backhaul communication unit 220 converts a bit stream transmitted from the base station to another node, for example, another access node, another base station, a higher node, or a core network, into a physical signal, and converts a physical signal received from another node into a bit stream.

The storage unit 230 may store data, such as a basic program for operation of a base station, an application, configuration information, and the like. The storage unit 230 may include volatile memory, nonvolatile memory, or a combination of volatile memory and nonvolatile memory. The storage unit 230 provides stored data in response to a request of the control unit 240.

The control unit 240 controls the overall operation of the base station. For example, the control unit 240 transmits and receives a signal via the radio communication unit 210 or the backhaul communication unit 220. Further, the control unit 240 records data in the storage unit 230 and reads the recorded data. The control unit 240 may perform the functions of a protocol stack required by the communication standard. According to another implement, the processor stack may be included in the radio communication unit 210. To this end, the control unit 240 may include at least one processor.

According to various embodiments, the control unit 240 may perform control to: transmit, to a terminal, configuration information including a bandwidth part configuration in an unlicensed spectrum; perform a channel access procedure for each of subbands included in the bandwidth part; initiate channel access via at least one subband determined to be an idle channel according to a result of the channel access procedure; transmit, to the terminal, the result of the channel access procedure for each subband; and transmit, to the terminal, a data channel according to the result of the channel access procedure for each subband. For example, the control unit 240 may control the base station to perform operations according to various embodiments described below.

Figure 3:
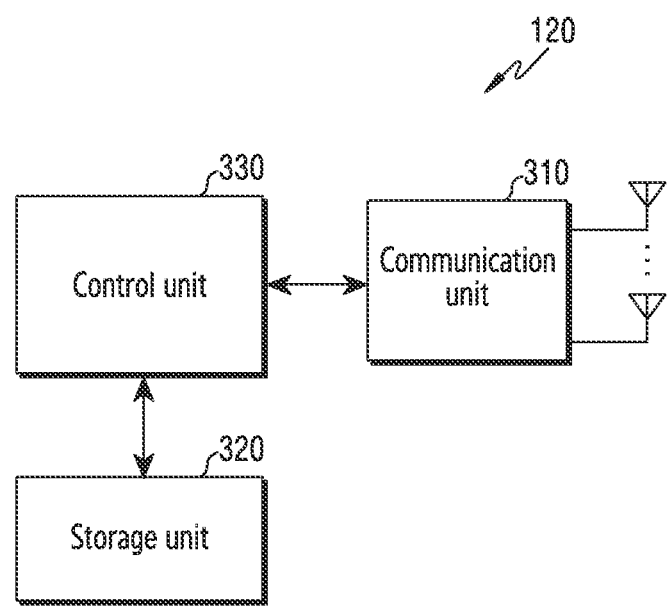
FIG. 3 illustrates the configuration of a terminal in the radio communication system according to an embodiment of the disclosure.

FIG. 3 illustrates the configuration of a terminal in the radio communication system according to an embodiment of the disclosure.

The configuration illustrated in FIG. 3 may be understood as the configuration of the UE 120. The term "-unit" or "-er" used hereinafter may refer to a unit that processes at least one function or operation, and may be implemented in hardware, software, or a combination of hardware and software.

Referring to FIG. 3, the terminal includes a communication unit 310 (e.g., a transceiver), a storage unit 320, and a control unit 330 (e.g., at least one processor).

The communication unit 310 performs functions for transmitting or receiving a signal through a wireless channel. For example, the communication unit 310 performs a function of conversion between a baseband signal and a bit stream according to a physical layer standard of a system. For example, when data is transmitted, the communication unit 310 generates complex symbols by encoding and modulating a transmission bit stream. Also, when data is received, the communication unit 310 restores a reception bit stream by demodulating and decoding a baseband signal. Also, the communication unit 310 up-converts a baseband signal into an RF band signal and transmits the same through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array including multiple antenna elements. In terms of hardware, the communication unit 310 may include a digital circuit and an analog circuit (e.g., a radio-frequency integrated circuit (RFIC)). The digital circuit and the analog circuit may be implemented in a single package. The communication unit 310 may include a plurality of RF chains. Further, the communication unit 310 may perform beamforming.

The communication unit 310 transmits and receives a signal as described above. Accordingly, all or a part of the communication unit 310 may be referred to as a "transmission unit", "reception unit", or "transmission/reception unit". Also, transmission and reception performed through a wireless channel, which will be described in the following descriptions, may be understood to mean that the above-described processing is performed by the communication unit 310.

The storage unit 320 may store data, such as a basic program for operation of a UE, an application, configuration information, and the like. The storage unit 320 may include volatile memory, nonvolatile memory, or a combination of volatile memory and nonvolatile memory. The storage unit 320 provides stored data in response to a request of the control unit 330.

The control unit 330 controls overall operations of the UE. For example, the control unit 330 transmits and receives a signal via the communication unit 310. Further, the control unit 330 records data in the storage unit 320 and reads the recorded data. The control unit 330 may perform the functions of a protocol stack required by the communication standard. To this end, the control unit 330 may include at least one processor or a microprocessor, or may be a part of a processor. A part of the communication unit 310 and the control unit 330 may be referred to as a communication processor (CP).

According to various embodiments, the control unit 330 may perform control to: receive configuration information including a bandwidth part configuration from a base station in an unlicensed spectrum; receive a channel access result for each subband of a bandwidth part from a base station; receive, from the base station, DCI for scheduling of uplink/downlink data channel transmission/reception; and perform uplink data channel transmission/reception according to the scheduling. For example, the control unit 330 may control the terminal to perform operations according to various embodiments described below.

Figure 4:
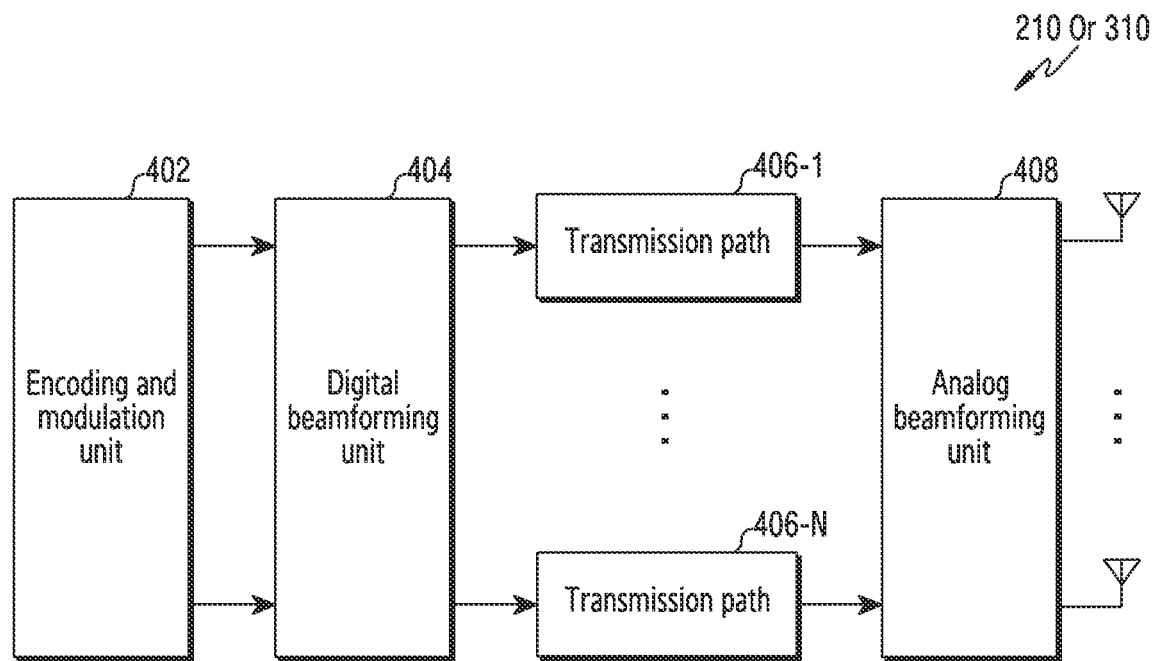
FIG. 4 illustrates the configuration of a communication unit in a radio communication system according to an embodiment of the disclosure.

FIG. 4 illustrates the configuration of a communication unit in a wireless communication system according to an embodiment of the disclosure.

FIG. 4 illustrates an example of a detailed configuration of the radio communication unit 210 of FIG. 2 or the communication unit 310 of FIG. 3. Specifically, FIG. 4 illustrates elements to perform beamforming as a part of the radio communication unit 210 of FIG. 2 or the communication unit 310 of FIG. 3.

Referring to FIG. 4, the radio communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one among a low-density parity check (LDPC) code, a convolution code, and a polar code may be used. The encoding and modulation unit 402 generates modulation symbols by performing constellation mapping.

The digital beamforming unit 404 performs beamforming on a digital signal (e.g., modulation symbols). To this end, the digital beamforming unit 404 multiplies modulation symbols by beamforming weights. Here, the beamforming weights are used to change a magnitude and phase of a signal, and may be referred to as "a precoding matrix", "a precoder", or the like. The digital beamforming unit 404 outputs digital-beamformed modulation symbols to the plurality of transmission paths 406-1 to 406-N. According to a multiple-input multiple-output (MIMO) transmission technique, the modulation symbols may be multiplexed, or the same modulation symbols may be provided to the plurality of transmission paths 406-1 to 406-N.

The plurality of transmission paths 406-1 to 406-N convert digital beamformed signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency-division multiplexing (OFDM) scheme, and may be excluded when another physical layer scheme (e.g., a filter bank multi-carrier (FBMC)) is applied. That is, the plurality of transmission paths 406-1 to 406-N provide independent signal processing processes to a plurality of streams generated via digital beamforming. However, depending on the implementation scheme, some elements of the plurality of transmission paths 406-1 to 406-N may be used in common.

The analog beamforming unit 408 performs beamforming on an analog signal. To this end, the analog beamforming unit 408 multiplies analog signals by beamforming weights. The beamforming weights are used to change the magnitude and the phase of a signal. Specifically, according to a connection structure between the plurality of transmission paths 406-1 to 406-N and antennas, the analog beamforming unit 408 may be configured in various manners. For example, each of the plurality of transmission paths 406-1 to 406-N may be connected to one antenna array. As another example, the plurality of transmission paths 406-1 to 406-N may be connected to one antenna array. As still another example, the plurality of transmission paths 406-1 to 406-N may be adaptively connected to one antenna array, or may be connected to two or more antenna arrays.

Figure 5:
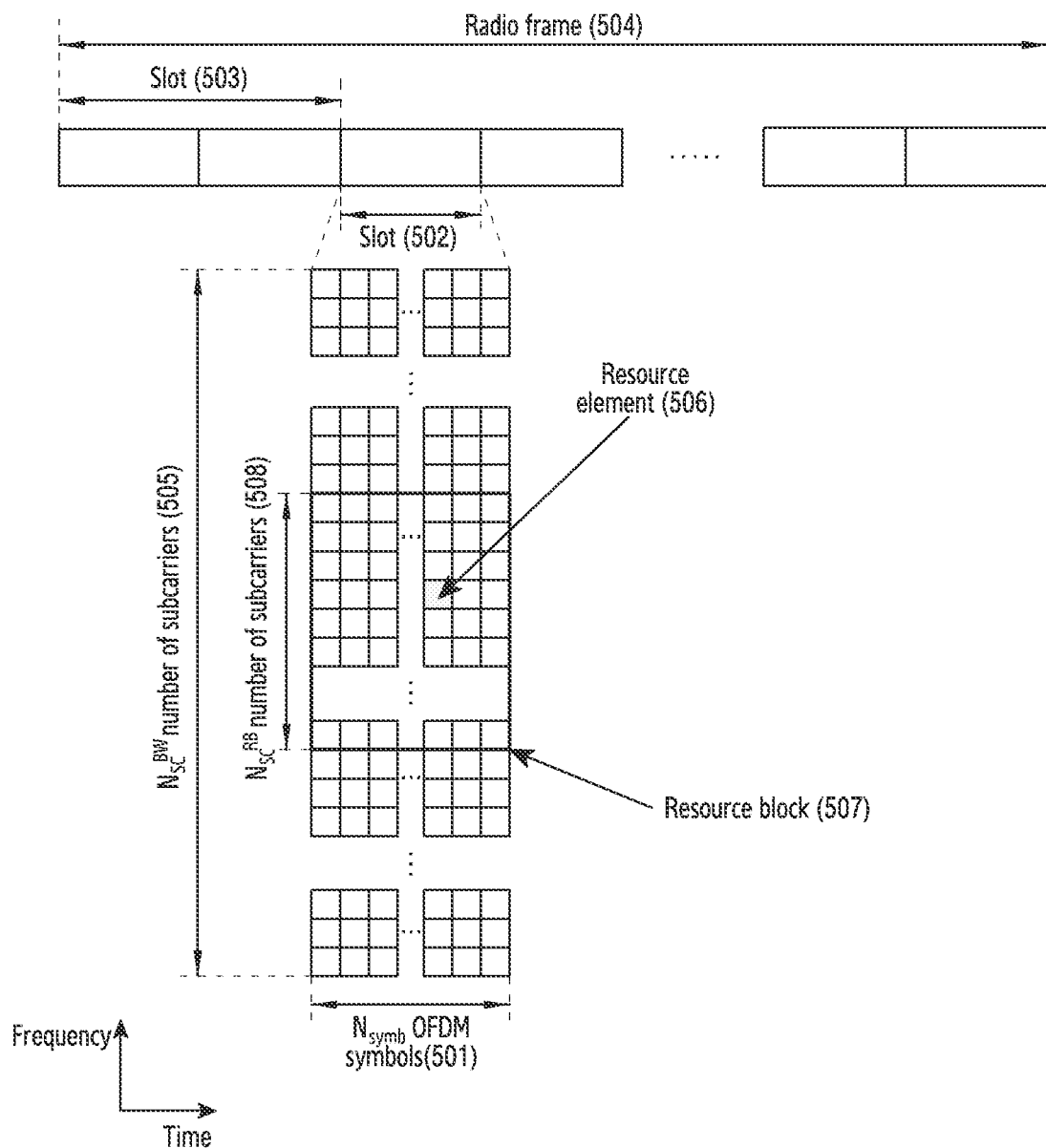
FIG. 5 illustrates a transmission structure of a time-frequency domain, which is a radio resource area, in the radio communication system according to an embodiment of the disclosure.

FIG. 5 illustrates a transmission structure of a time-frequency domain, which is a radio resource area, in the wireless communication system according to an embodiment of the disclosure. In various embodiments, the radio communication system may include an NR system.

Referring to FIG. 5, the horizontal axis represents a time domain and the vertical axis represents a frequency domain in the radio resource area. A minimum transmission unit in the time domain may be an orthogonal frequency-division multiplexing (OFDM) symbol and/or a discrete Fourier transform (DFT)-spread-OFDM (DFT-s-OFDM) symbol, and $N_{symb}$ OFDM and/or DFT-s-OFDM symbols 501 may be combined to constitute one slot 502. In various embodiments, the OFDM symbol may include a symbol for the case of transmitting or receiving a signal using an OFDM multiplexing scheme, and the DFT-s-OFDM symbol may include a symbol for the case of transmitting or receiving a signal using a DFT-s-OFDM or single-carrier frequency-division multiple access (SC-FDMA) multiplexing scheme. Hereinafter, in the disclosure, an embodiment of an OFDM symbol is described for the convenience of description, but such an embodiment of a DFT-s-OFDM symbol is also applicable. In addition, in the disclosure, an embodiment relating to downlink signal transmission/reception is described for the convenience of description, but this may also be applicable to an embodiment relating to uplink signal transmission/reception.

If subcarrier spacing (SCS) is 15 kHz, one slot 502 constitutes one subframe 503, and the length of each of the slot 502 and the subframe 503 may be 1 ms. In various embodiments, the number of slots 502 and the length of the slots 502 constituting one subframe 503 may vary according to subcarrier spacing. For example, when the subcarrier spacing is 30 kHz, four slots 502 may constitute one subframe 503. In this case, the length of the slot 502 is 0.5 ms and the length of the subframe 503 is 1 ms. A radio frame 504 may be a time domain section including 10 subframes. A minimum transmission unit in a frequency domain is a subcarrier, and the entire system transmission bandwidth may include a total of NscBW subcarriers 505.

However, subcarrier spacing, the number of slots 502 included in the subframe 503, the length of the slot 502, and the length of the subframe 503 may be variably applied. For example, in the case of an LTE system, subcarrier spacing is 15 kHz, and two slots constitute one subframe 503, wherein the length of the slot 502 may be 0.5 ms and the length of the subframe 503 may be 1 ms.

A basic resource unit in a time-frequency domain may be a resource element (RE) 506, and the resource element 506 may be represented by an OFDM symbol index and a subcarrier index. A resource block (RB or physical resource block (PRB)) 507 may be defined by $N_{symb}$ consecutive OFDM symbols 501 in the time domain and $N_{SC}^{RB}$ consecutive subcarriers 508 in the frequency domain. Accordingly, one RB 507 in one slot 502 may include $N_{symb} \times N_{SC}^{RB}$ Res. In various embodiments, a minimum allocation unit of data in the frequency domain may be RB 507. In the NR system, the number of symbols $N_{symb}$ included in one RB may be 14 ($N_{symb}$=14), the number of subcarriers $N_{SC}^{RB}$ may be 12 ($N_{SC}^{RB}$=12), and the number of RBs (NRBs) may vary according to the bandwidth of a system transmission band. In the LTE system, the number of symbols $N_{symb}$ included in one RB may be 7 ($N_{symb}$=7), the number of subcarriers $N_{SC}^{RB}$ may be 12 ($N_{SC}^{RB}$=12), and the NRBs may vary according to a bandwidth of a system transmission band.

Downlink control information may be transmitted within the first N OFDM symbols in the subframe. In general, N may be 1, 2, or 3, and the terminal may receive, from the base station, a configuration of the number of symbols on which downlink control information may be transmitted through higher-laying signaling. According to the amount of control information to be transmitted in a current slot, the base station may change, for each slot, the number of symbols on which the downlink control information may be transmitted in the slot, and may transfer information on the number of symbols to the terminal via a separate downlink control channel.

In the NR and/or LTE system, scheduling information for downlink data or uplink data may be transferred from the base station to the terminal via downlink control information (DCI). In various embodiments, the DCI may be defined according to various formats, and each format may indicate whether the DCI includes scheduling information (e.g., UL grant) for uplink data and includes scheduling information (e.g., DL grant) for downlink data, whether the DCI is compact DCI having a small size of control information, whether the DCI is fallback DCI, whether spatial multiplexing using multiple antennas is applied, and/or whether the DCI is for power control. For example, the DCI format (e.g., DCI format 1_0 of NR), which is scheduling control information (DL grant) for downlink data, may include at least one of the following control information.

Control information format identifier (DCI format identifier): Identifier to distinguish a DCI format Frequency domain resource assignment: Indicating an RB allocated for data transmission Time domain resource assignment: Indicating a slot and symbol allocated for data transmission VRB-to-PRB mapping: Indicating whether to apply a virtual resource block (VRB) mapping scheme Modulation and coding scheme (MCS): Indicating the modulation scheme used for data transmission and the size of a transport block, which is data to be transmitted New data indicator: Indicating whether transmission is initial transmission or retransmission Redundancy version: Indicating a redundancy version of HARQ HARQ process number: Indicating a process number of HARQ PDSCH allocation information (downlink assignment index): Indicating, to the terminal, the number of PDSCH reception results to be reported to the base station (for example, the number of HARQ-ACKs)

Transmission power control (TPC) command for physical uplink control channel (PUCCH): Indicating a transmission power control command for PUCCH, which is an uplink control channel PUCCH resource indicator: Indicating a PUCCH resource used for HARQ-ACK reporting, including a reception result for PDSCH configured on the basis of corresponding DCI PUCCH transmission timing indicator (PDSCH-to-HARQ_feedback timing indicator): Indicating information of a slot or symbol, on which a PUCCH for HARQ-ACK report including a reception result for a PDSCH configured on the basis of corresponding DCI should be transmitted The DCI may be transmitted on a physical downlink control channel (PDCCH) (or control information, hereinafter used interchangeably) or an enhanced PDCCH (EPDCCH) (or enhanced control information, hereinafter used interchangeably), which is a downlink physical control channel, via a channel coding and modulation process. Hereinafter, transmission/reception of PDCCH or EPDCCH may be understood as DCI transmission/reception on PDCCH or EPDCCH, and transmission/reception of a physical downlink shared channel (PDSCH) may be understood as transmission/reception of downlink data on PDSCH.

In various embodiments, a cyclic redundancy check (CRC) scrambled with a specific radio network temporary identifier (RNTI) (or terminal identifier C-RNTI) independent for each terminal is added to DCI, and the DCI for each terminal may be channel-coded and then transmitted as an independent PDCCH. In the time domain, the PDCCH may be transmitted during a control channel transmission interval. The mapping position of the PDCCH in the frequency domain may be determined by the identifier (ID) of each terminal, and may be transmitted in the entire system transmission band.

Downlink data may be transmitted on a physical downlink shared channel (PDSCH), which is a physical channel for downlink data transmission. The PDSCH may be transmitted after the control channel transmission interval, and scheduling information, such as a modulation scheme for the PDSCH and the mapping position of the PDSCH in the frequency domain, may be determined on the basis of the DCI transmitted through the PDCCH.

On the basis of a modulation coding system (MCS) in control information constituting DCI, the base station may notify the terminal of a transport block size (TBS) of data to be transmitted and a modulation scheme applied to the PDSCH. In various embodiments, the MCS may include five bits or more or fewer than 5 bits. The TBS corresponds to the size of a transport block (TB) before channel coding for error correction is applied to a data TB to be transmitted by the base station.

A modulation scheme supported by the NR system may include at least one among quadrature phase shift keying (QPSK), 16 quadrature amplitude modulation (QAM), 64QAM, and 256QAM, and modulation orders (Qms) may be 2, 4, 6, and 8, respectively. That is, 2 bits per symbol for QPSK modulation, 4 bits per symbol for 16QAM modulation, 6 bits per symbol for 64QAM modulation, and 8 bits per symbol for 256QAM modulation may be transmitted. Further, a modulation scheme of 256QAM or greater may be used according to system modification.

In the NR system, an uplink/downlink HARQ scheme may include an asynchronous HARQ scheme in which a data retransmission time is not fixed. For example, in the case of downlink, when the base station receives, from the terminal, HARQ NACK feedback for initially transmitted data, the base station may freely determine the time at which to retransmit data according to a scheduling operation. The terminal may buffer data determined to have an error, as a result of decoding the received data for an HARQ operation, and may then combine the buffered data with the data retransmitted from the base station. HARQ ACK/NACK information of the PDSCH transmitted in subframe n-k may be transmitted from the terminal to the base station through the PUCCH or the PUSCH in subframe n.

According to an embodiment, in the case of a 5G communication system such as NR, the value of k may be transmitted while being included in DCI indicating or scheduling reception of the PDSCH transmitted in subframe n-k, or may be configured in the terminal via higher-layer signaling. In this case, the base station may configure one or more k values to the terminal via higher-layer signaling, or may indicate a specific k value to the terminal on the basis of DCI. Here, k may be determined according to the HARQ-ACK processing capability of the terminal, that is, the minimum time required for the terminal to receive the PDSCH, and may generate and report the HARQ-ACK for the PDSCH. The terminal may use, as the value of k, a default value or a predefined value before the value of k is configured.

Various embodiments of the disclosure are described on the basis of the NR system. However, the content of the disclosure is not limited to the NR system, and may be applied to various radio communication systems, such as LTE, LTE-A, LTE-A-Pro, and 5G. In addition, the content of the disclosure describes a system and a device that transmit or receive signals using an unlicensed spectrum, but the disclosure may be applicable to a system operating in a licensed spectrum.

Hereinafter, in the disclosure, higher-layer signaling or a higher-layer signal may correspond to a method for transferring a signal from the base station to the terminal using a downlink data channel of a physical layer processor, or transferring a signal from the terminal to the base station using an uplink data channel of a physical layer, wherein the method includes at least one of radio resource control (RRC) signaling, packet data convergence protocol (PDCP) signaling, or a method for transferring a signal via a media access control (MAC) control element (CE). The higher-layer signaling or higher-layer signal may include system information, for example, a system information block (SIB), which is commonly transmitted to a plurality of terminals.

In the case of a system that performs communication in an unlicensed spectrum, a communication device (a base station or a terminal) that is to transmit a signal via the unlicensed spectrum may perform a channel access procedure (or listen-before-talk (LBT)) with respect to the unlicensed spectrum, in which communication is to be performed before transmitting the signal, and in a case where the unlicensed spectrum is determined to be idle according to the channel access procedure, the communication device may access the unlicensed spectrum and perform signal transmission. If it is determined, according to the performed channel access procedure, that the unlicensed spectrum is not idle, the communication device may not be able to perform signal transmission.

The channel access procedure in the unlicensed spectrum may be classified according to whether a start time of the channel access procedure of the communication device is fixed (frame-based equipment (FBE)) or variable (load-based equipment). The communication device may be determined to be an FBE device or an LBE device depending on whether a transmission/reception structure of the communication device has one cycle or has no cycle, in addition to the start time of the channel access procedure. Here, the start time of the channel access procedure, which is fixed, means that the channel access procedure of the communication device may periodically start according to a predefined interval or an interval configured or declared by the communication device. As another example, the start time of the channel access procedure, which is fixed, may mean that a transmission/reception structure of the communication device has one interval. The start time of the channel access procedure, which is variable, means that the start time of the channel access procedure is possible at any time in the case where the communication device is to transmit a signal via the unlicensed spectrum. As another example, the start time of the channel access procedure, which is variable, may mean that the transmission or reception structure of the communication device does not have an interval and may be determined when necessary.

Hereinafter, a channel access procedure in the case where a time point of starting the channel access procedure of a communication device (hereinafter, a traffic-based channel access procedure or a channel access procedure) is load-based equipment will be described.

The channel access procedure in the unlicensed spectrum may include: measuring, by the communication device, an intensity of a signal received via the unlicensed spectrum for a fixed time or a time period (e.g., a time calculated on the basis of at least one random value selected by the base station or the terminal) calculated according to a predefined rule; and comparing the measured intensity of the received signal with a predefined threshold value or a threshold value calculated according to a function to determine the magnitude of the intensity of the received signal according to at least one parameter of a channel bandwidth or a signal bandwidth, in which a signal to be transmitted is transmitted, and/or the magnitude of an intensity of transmission power, so as to determine the idle state of the unlicensed spectrum.

For example, the communication device may measure the intensity of the received signal during X μs (for example, 25 μs) immediately before the time at which the signal is to be transmitted, and when the measured intensity of the signal is less than a predefined or calculated threshold value T (e.g., −72 dBm), the communication device may determine that the unlicensed spectrum is in an idle state and may transmit the configured signal. After the channel access procedure, the maximum time available for continuous signal transmission may be restricted according to the maximum channel occupancy time for each country, region, and frequency band according to each unlicensed spectrum, and may also be restricted according to a communication device type (e.g., a base station or a terminal, or a master device or a slave device). For example, in the case of Japan, in an unlicensed spectrum of 5 GHz, a base station or a terminal may perform a channel access procedure, and may then occupy a channel for up to 4 ms without performing an additional channel access procedure so as to transmit a signal, with respect to the unlicensed spectrum determined to be in the idle state.

More specifically, when the base station or the terminal is to transmit a downlink or uplink signal in the unlicensed spectrum, the channel access procedure that can be performed by the base station or the terminal may be classified into at least the following types.

Type 1: After performing a channel access procedure for a variable time period, performing uplink/downlink signal transmission Type 2: After performing a channel access procedure for a fixed time period, performing uplink/downlink signal transmission Type 3: Performing uplink or downlink signal transmission without performing a channel access procedure A transmission device (e.g., a base station or a terminal) that is to transmit a signal to an unlicensed spectrum may determine a scheme (or a type) of a channel access procedure depending on the type of the signal to be transmitted. Hereinafter, in the disclosure, for the convenience of description, it is assumed that a transmission device is a base station, and the terms "transmission device" and "base station" may be used interchangeably.

For example, when a base station is to transmit a downlink signal including a downlink data channel in an unlicensed spectrum, the base station may perform a Type 1 channel access procedure. When the base station is to transmit a downlink signal that does not include a downlink data channel in an unlicensed spectrum, for example, when the base station is to transmit a synchronization signal or a downlink control channel, the base station may perform a Type 2 channel access procedure, and may transmit the downlink signal.

In this case, the scheme of the channel access procedure may be determined according to the transmission length of a signal to be transmitted to the unlicensed spectrum or the length of an interval or the time for which the unlicensed spectrum is occupied. In general, in a Type 1 scheme, a channel access procedure may be performed for a longer time than the channel access procedure performed in a Type 2 scheme. Therefore, when a communication device is to transmit a signal for a short time interval or a time period equal to or less than a reference time (e.g., Xms or Y symbol), the Type 2 channel access procedure may be performed. On the other hand, when a communication device is to transmit a signal for a long time interval or a time period equal to or longer than the reference time (e.g., Xms or Y symbol), the Type 1 channel access procedure may be performed. In other words, channel access procedures may be performed using different schemes depending on the usage time of the unlicensed spectrum.

If the transmission device performs the Type 1 channel access procedure according to at least one of the described criteria, the transmission device may determine a channel access priority class (or a channel access priority) according to a quality of service class identifier (QCI) of a signal to be transmitted to the unlicensed spectrum, and may perform the channel access procedure using at least one value among predefined values shown in Table 1 with respect to the determined channel access priority class. Table 1 below shows the mapping relationship between the channel access priority class and the QCI.

For example, QCI 1, 2, and 4 refer to QCI values for services, such as a conversational voice, a conversational video (live streaming), and a non-conversational video (buffered streaming), respectively. If a signal for a service that does not match the QCI in Table 1 is to be transmitted to the unlicensed spectrum, the transmission device may select a service and a QCI closest to the QCI of Table 1, and may select channel access priority class therefor.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

In various embodiments, a parameter value (e.g., a delay interval (defer duration), a contention window value or a set of magnitudes CW_p and a minimum and a maximum value of contention interval (contention window) (CW_min, p, CW_max, p), and a maximum channel occupiable interval (T_mcot, p) according to the determined channel access priority p) for the channel access priority class may be determined as shown in Table 2. Table 2 shows parameter values for the channel access priority types in the case of downlink.

In other words, the base station to transmit a downlink signal to the unlicensed spectrum may perform a channel access procedure for the unlicensed spectrum for at least the T_f+m_p*T_sl time period. If the base station is to perform a channel access procedure with channel access priority class 3 (p=3), the size of T_f+m_p*T_sl may be configured using mp=3 with respect to the size T_f+m_p*T_sl of the delay interval (defer duration) necessary for performing the channel access procedure. Here, T_f corresponds to a value fixed to 16 μs, and a first T_sl time during T_f should be idle, and the base station may not perform the channel access procedure at the remaining time T_f-T_sl after the T_sl time during the T_f time. Even if the base station performs the channel access procedure at the remaining time T_f-T_sl, the result of the channel access procedure may not be used. In other words, time T_f-T_sl is a time for delaying, by the base station, execution of the channel access procedure.

If the unlicensed spectrum is determined to be idle in all m_p*T_sl times, N may be N−1. N may be selected as any integer value between 0 and a value CW_p of the contention window at the time of performing the channel access procedure. In the case of channel access priority class 3, a minimum contention window value and a maximum contention window value are 15 and 63, respectively. If the unlicensed spectrum is determined to be idle in the delay interval and an additional interval in which the channel access procedure is performed, the base station may transmit a signal via the unlicensed spectrum for T_mcot, p time period (8 ms). Table 2 shows a channel access priority class (or channel access priority) in downlink. In the disclosure, for the convenience of description, embodiments are described on the basis of a downlink channel access priority class. In the case of uplink, the channel access priority class of Table 2 may be used in the same manner, or a separate channel access priority class for uplink transmission may be used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p is the minimum value CW_min, p of the contention window. The base station that has selected value N may perform the channel access procedure in interval T_sl, and when the unlicensed spectrum is determined to be idle via the channel access procedure performed in interval T_sl, the value is changed to N=N−1, and when N=0, the signal may be transmitted via the unlicensed spectrum for up to T_mcot, p time period. If it is determined that the unlicensed spectrum is not idle, via the channel access procedure at T_sl time, the base station may perform the channel access procedure again without changing the value of N.

The size of the contention window CW_p may be changed or maintained according to a ratio Z of NACK from among reception results (ACK/NACK) for downlink data (e.g., downlink data received in a reference subframe or a reference slot) transmitted or reported to the base station by one or more terminals having received downlink data transmitted through a downlink data channel in the reference subframe or the reference slot. The reference subframe or the reference slot may be determined on the basis of a downlink signal transmission interval (or a maximum channel occupancy time (MCOT)), in which the base station most recently transmitted a signal, at a time point at which the base station starts the channel access procedure or a time point at which the base station selects value N to perform the channel access procedure, and immediately before the two time points.

Figure 6:
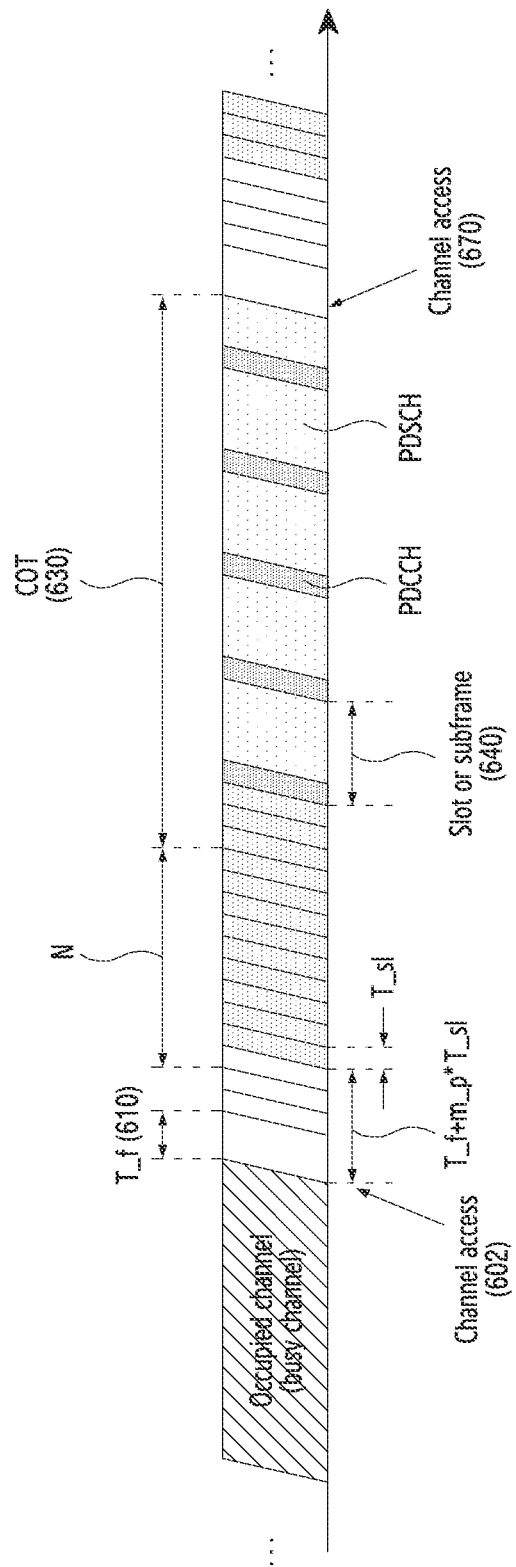
FIG. 6 illustrates a first example of a channel access procedure in an unlicensed spectrum in the radio communication system according to an embodiment of the disclosure.

FIG. 6 illustrates a first example of a channel access procedure in an unlicensed spectrum in the radio communication system according to an embodiment of the disclosure.

Referring to FIG. 6, a first slot or a subframe 640 of a downlink signal transmission interval (channel occupancy time, hereinafter, COT, 630), in which the base station most recently transmitted a signal via an unlicensed spectrum, immediately before or at a time point at which the base station selects value N for performing the channel access procedure or a time point 670 at which the base station starts the channel access procedure may be defined as a reference slot or reference subframe. Specifically, a subframe including a first slot or subframe, in which a signal is transmitted, in all slots or subframes of the downlink signal transmission interval 630 may be defined as a reference slot or subframe. If the downlink signal transmission interval starts after a first symbol of the slot or subframe, a first subframe, in which a signal is transmitted, in all subframes and the slot or subframe, in which downlink signal transmission starts, may be defined as a reference slot or subframe. When the proportion of NACK in a result of receiving downlink data transmitted or reported to the base station by one or more terminals, which have received the downlink data transmitted through the downlink data channel in the reference slot or subframe, is greater than Z, the base station may determine a value or size of a contention window, used for the channel access procedure 670 of the corresponding base station, to correspond to the next largest contention window after the contention window that was used for a previous channel access procedure 602, that is, the size of the contention window is increased, so as to perform the channel access procedure 670.

If the base station cannot receive the result of receiving the downlink data channel transmitted in the first slot or subframe in the transmission interval 630, for example, when a time interval between the first subframe and a time point 670 at which the base station starts the channel access procedure is equal to or less than an n slots or subframes (in other words, when the base station starts the channel access procedure before the time at which the terminal reports a downlink data channel reception result for the first subframe), a first subframe in a most recent downlink signal transmission interval, in which downlink signal transmission has been performed before the downlink signal transmission interval 630, may be the reference subframe.

In other words, when the base station cannot receive, from the terminal, a reception result for the downlink data transmitted in the reference subframe 640 immediately before or at a time point at which the base station selects value N for performing the channel access procedure or the time point 670 at which the base station starts the channel access procedure, the base station may determine, as the reference subframe, a first subframe in a most recently transmitted downlink signal transmission interval, among reception results for the downlink data channel previously received from the terminals. The base station may determine the size of the contention window used for the channel access procedure 670 using the downlink data reception results received from the terminals with respect to the downlink data transmitted through the downlink data channel in the reference subframe.

For example, the base station, having transmitted a downlink signal via the channel access procedure (e.g., CW_p=15) according to channel access priority class 3 (p=3), may increase the contention window from a default value (CW_p=15) to a next contention window value (CW_p=31) when it is determined that NACK is equal to or more than 80% in the reception results of the terminals with respect to the downlink data transmitted to the terminals through the downlink data channel in the first subframe. The rate of 80% is exemplary, and various variations are possible.

If it is not determined that 80% or more of the reception results are NACK, the base station may maintain an existing value as a value of the contention window, or may change the value of the contention window to the default value. In this case, the change in the contention window may be commonly applied to all channel access priority classes, or may be applied only to the channel access priority class used for the channel access procedure. A method for determining a reception result valid for determining a change in the size of the contention window, from among the reception results for the downlink data that is transmitted or reported to the base station by the terminal with respect to the downlink data transmitted through the downlink data channel in the reference subframe or the reference slot, in which the change in the size of the contention window is determined, in other words, a method for determining value Z, is as follows.

If the base station transmits one or more codewords or TBs to one or more terminals in the reference subframe or the reference slot, the base station may determine the value of Z on the basis of the ratio of NACK in the reception results that are transmitted or reported by the terminal with respect to the TBs received in the reference subframe or the reference slot. For example, when two codewords and two TBs are transmitted to one terminal in the reference subframe or the reference slot, the base station may receive or be reported results of downlink data signals for two TBs from the terminal. If the ratio Z of NACK in the two reception results is equal to or greater than a threshold value (e.g., Z=80%) predefined or configured between the base station and the terminal, the base station may change or increase the size of the contention window.

If the terminal bundles the reception results of the downlink data for one or more subframes (e.g., M subframes) including the reference subframe or slot, and transmits or reports the bundled reception results to the base station, the base station may determine that the terminal has transmitted M reception results. Further, the base station may determine the value of Z on the basis of the ratio of NACK among M received results, and may change, maintain, or initiate the size of the contention window.

If the reference subframe is a second slot in two slots included in one subframe, or if downlink data is transmitted from a symbol after a first symbol in the reference subframe, the value of Z may be determined based on the ratio of NACK in the reception results transmitted or reported to the base station by the terminal with respect to the downlink data received in the reference subframe (in other words, a second slot) and a subsequent subframe.

Further, in the case where scheduling information or downlink control information for the downlink data channel transmitted by the base station is transmitted in the same cell and frequency band as those in which the downlink data channel is transmitted, or in the case where the scheduling information or downlink control information for the downlink data channel transmitted by the base station is transmitted via an unlicensed spectrum, but is transmitted at a cell or frequency different from the cell or frequency at which the downlink data channel is transmitted, when the terminal is determined to transmit no reception result for the downlink data received in the reference subframe or the reference slot, and when the reception result for the downlink data transmitted by the terminal is determined to be at least one of discontinuous transmission (DTX), NACK/DTX, or any state, the base station may determine, as NACK, the reception result of the terminal, so as to determine the value of Z.

Further, in the case where the scheduling information or downlink control information for the downlink data channel transmitted by the base station is transmitted via the unlicensed spectrum, when the reception result for the downlink data transmitted by the terminal is determined to be at least one of DTX, NACK/DTX, or any state, the base station may not allow the reference value Z of contention window variation to reflect the reception result of the terminal. In other words, the base station may determine the value of Z while disregarding the reception result of the terminal.

In the case where the base station transmits the scheduling information or downlink control information for the downlink data channel via a licensed spectrum, when the terminal has not actually transmitted downlink data (no transmission) on the basis of the reception result of the downlink data with respect to the reference subframe or the reference slot, for which the terminal has performed transmission or reporting to the base station, the base station may determine the value of Z for the downlink data while disregarding the reception result transmitted or reported by the terminal.

Hereinafter, a channel access procedure in the case where the time point of starting the channel access procedure of a communication device (hereinafter, a frame-based channel access procedure or a channel access procedure) is fixed (frame-based equipment, FBE) will be described using FIG. 3.

Figure 7:
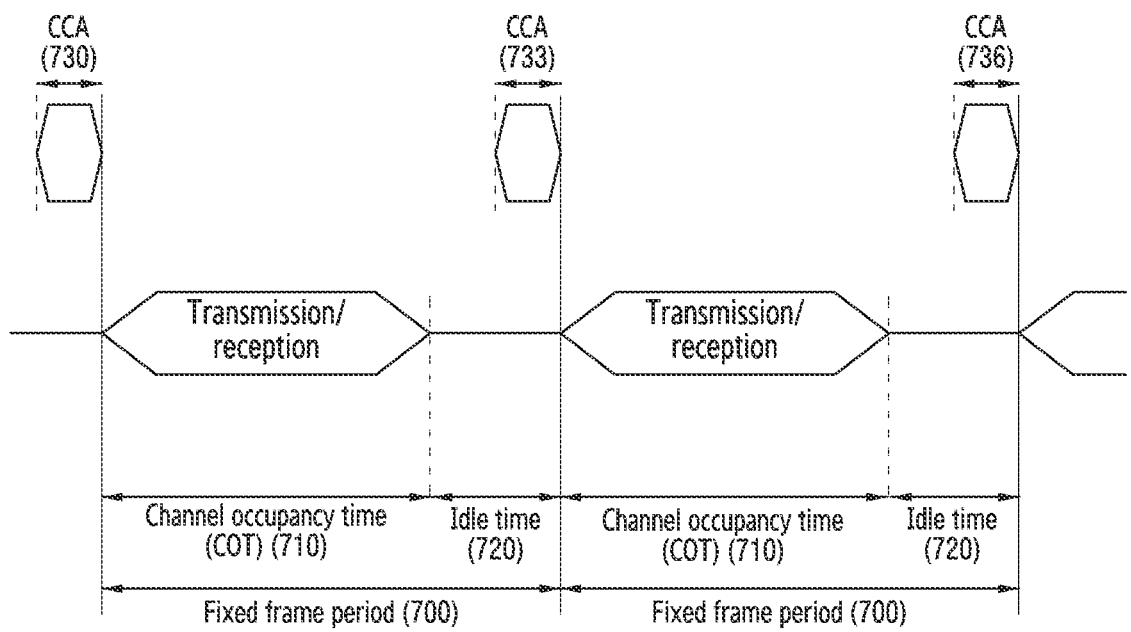
FIG. 7 illustrates a second example of the channel access procedure in the unlicensed spectrum in the radio communication system according to an embodiment of the disclosure.

FIG. 7 illustrates a second example of the channel access procedure in the unlicensed spectrum in the radio communication system according to an embodiment of the disclosure.

Referring to FIG. 7, a communication device that performs a frame-based channel access procedure may periodically transmit or receive a signal according to a fixed frame period (FFP). Here, a fixed frame period 700 may be declared or configured by a communication device (e.g., a base station), and the fixed frame period may be configured from 1 ms to 10 ms. A channel access procedure (or clear channel access (CCA)) for an unlicensed spectrum may be performed immediately before 730, 733, and 736 starting respective frame periods, and the channel access procedure may be performed for a fixed time or one observation slot period, as shown in the Type 2 channel access procedure. If the unlicensed spectrum is determined to be in an idle state or an idle channel on the basis of a result of the channel access procedure, the communication device may transmit or receive a signal without additionally performing the channel access procedure for up to 95% of the fixed frame period 700 (hereinafter, a channel occupancy time (COT) 710). In this case, at least 5% of the fixed frame period 700 is an idle time 720, during which a signal cannot be transmitted or received, and the channel access procedure may be performed within the idle time 720.

The frame-based channel access procedure is advantageous in that a method for performing a channel access procedure is relatively simple compared to the traffic-based channel access procedure, and channel access in an unlicensed spectrum may be periodically performed. However, the frame-based channel access procedure is disadvantageous in that, because a time point of starting the channel access procedure is fixed, the probability of accessing the unlicensed spectrum is decreased compared to the traffic-based channel access procedure.

In a 5G system, a frame structure needs to be defined flexibly by considering various services and requirements. For example, each service may have different subcarrier spacing according to requirements. A current 5G communication system supports a plurality of subcarrier spacings, and the subcarrier spacing may be determined from Equation 1.

$$\Delta f = f_0 2^m \qquad \text{Equation 1}$$

In Equation 1, f0 refers to a basic subcarrier spacing, m refers to a scaling factor of an integer, and $\Delta f$ refers to a subcarrier spacing. For example, when f0 is 15 kHz, a set of subcarrier spacing that the 5G communication system may have may include at least one of 3.75 kHz, 7.5 kHz, 15 kHz, 30 kHz, 60 kHz, 120 kHz, 240 kHz, and 480 kHz. The available subcarrier spacing set may be different depending on the frequency band. For example, 3.75 kHz, 7.5 kHz, 15 kHz, 30 kHz, and 60 kHz may be used in a frequency band below 6 GHz, and 60 kHz, 120 kHz, and 240 kHz may be used in a frequency band above 6 GHz.

In various embodiments, the length of an OFDM symbol may vary according to subcarrier spacing configuring the OFDM symbol. This is because, according to the characteristics of the OFDM symbol, the subcarrier spacing and the length of the OFDM symbol have an inverse relationship with each other. For example, if the subcarrier spacing is doubled, a symbol length is halved, and conversely, if the subcarrier spacing is halved, the symbol length is doubled.

Figure 8:
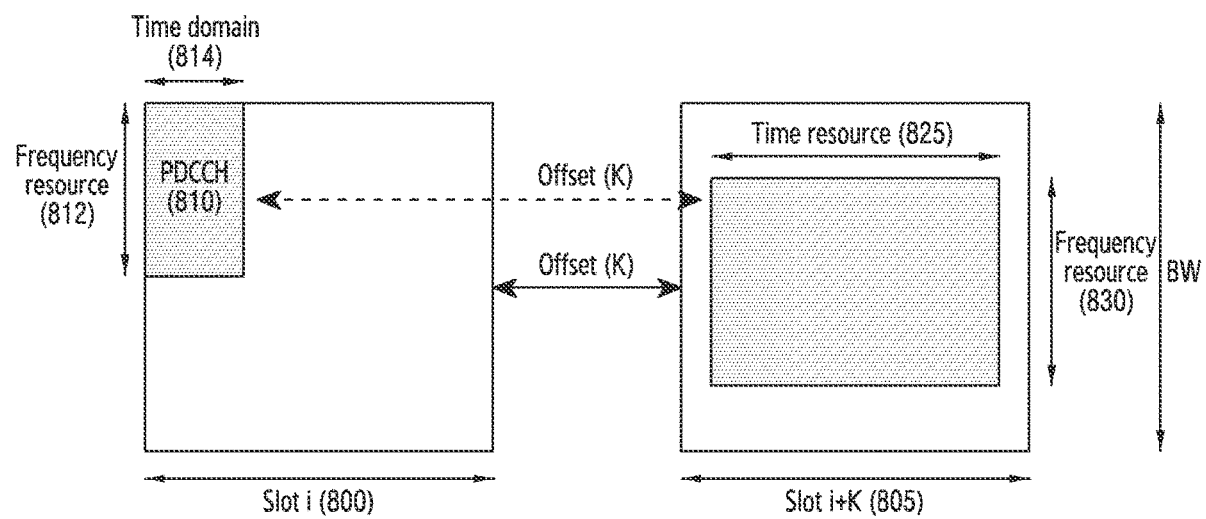
FIG. 8 illustrates a resource area and a method for downlink and/or uplink scheduling and hybrid automatic repeat request (HARQ)-acknowledgment (ACK) feedback for the scheduling in the radio communication system according to an embodiment of the disclosure.

FIG. 8 illustrates a resource area and a method for downlink and/or uplink scheduling and HARQ-ACK feedback for the scheduling in the radio communication system according to an embodiment of the disclosure.

Referring to FIG. 8, a resource area in which a data channel is transmitted in a 5G or NR communication system is illustrated. A terminal may monitor and/or search a PDCCH 810 in a downlink control channel (hereinafter, referred to as PDCCH) area (hereinafter, referred to as control resource set (CORESET) or search space (SS)) configured via a higher-layer signal from a base station. The downlink control channel area may include time-domain 814 information and frequency-domain 812 information, and the time-domain 814 information may be configured in symbol units and the frequency-domain 812 information may be configured in group units.

If the terminal detects the PDCCH 810 in slot i 800, the terminal may acquire downlink control information (DCI) transmitted through the detected PDCCH 810. On the basis of the received downlink control information (DCI), the terminal may acquire scheduling information for a downlink data channel or an uplink data channel In other words, the DCI may at least include information of a resource area (or a PDSCH transmission area) in which the terminal should receive the downlink data channel (hereinafter, PDSCH) from the base station, or information of a resource area which is allocated by the base station to the terminal for uplink data channel (PUSCH) transmission.

The case where the terminal is scheduled for uplink data channel (PUSCH) transmission will be described below. The terminal, having received DCI, may acquire, on the basis of the DCI, offset information K or a slot index for reception of a PUSCH, and may determine a PUSCH transmission slot index. For example, the terminal may determine that the terminal is scheduled to transmit the PUSCH in slot i+K 805 via the received offset information K, on the basis of slot index i 800 in which the PDCCH 810 has been received. The terminal may determine a PUSCH start symbol or time in slot i+K 805 or slot i+K via the received offset information K, on the basis of a CORESET in which the PDCCH 810 has been received.

The terminal may acquire, from DCI, information relating to a PUSCH transmission time-frequency resource area 840 in the PUSCH transmission slot 805. PUSCH transmission frequency resource area information 830 may include a physical resource block (PRB) or group unit information of the PRB. The PUSCH transmission frequency resource area information 830 may be related to an area included in an initial uplink bandwidth (initial BW, bandwidth) or an initial uplink bandwidth part (initial BWP, bandwidth part), which is determined or configured by the terminal via an initial access procedure. If the terminal receives an uplink bandwidth (BW, bandwidth) or an uplink bandwidth part (BWP, bandwidth part) via a higher-layer signal, the PUSCH transmission frequency resource area information 830 may be related to an area included in the uplink bandwidth (BW, bandwidth) or the uplink bandwidth part (BWP, bandwidth part), which is configured via a higher-layer signal.

In various embodiments, PUSCH transmission time resource area information 825 may be a symbol or group unit information of a symbol, or may be absolute time information. The PUSCH transmission time resource area information 825 may be expressed as a combination of a PUSCH transmission start time or symbol, the length of a PUSCH, or a PUSCH end time or symbol, and may be included as one field or value in DCI. The terminal may transmit the PUSCH in a PUSCH transmission resource area 840 determined on the basis of the DCI.

In various embodiments, the terminal having received the PDSCH 840 may report (feedback) a reception result (e.g., HARQ-ACK/NACK) for the PDSCH 840 to the base station. An uplink control channel (PUCCH) 870 transmission resource, in which the reception result for the PDSCH 840 is transmitted, may be determined by the terminal using a PUCCH resource indicator and a PDSCH-to-HARQ timing indicator, indicated via DCI 810 for scheduling of the PDSCH 840. In other words, the terminal, having received a PDSCH-to-HARQ timing indicator K1 on the basis of the DCI 810, may transmit the PUCCH 870 from a PDSCH 840 reception slot 805 to a slot 850 after K1. The PUCCH 870 transmission resource in the PUCCH transmission slot 850 may perform PUCCH transmission in a resource indicated via a PUCCH resource indicator of DCI 410. When a plurality of PUCCH transmissions is configured or indicated in the PUCCH transmission slot 850, the terminal may perform PUCCH transmission in a PUCCH resource other than the resource indicated via the PUCCH resource indicator of the DCI 810.

In the 5G communication system, in order to dynamically change a downlink signal transmission interval and an uplink signal transmission interval in a time-division duplexing (TDD) system, whether each of OFDM symbols constituting one slot is a downlink symbol, an uplink symbol, or a flexible symbol may be supported by a slot format indicator (SFI). The symbol indicated as a flexible symbol may be neither a downlink symbol nor an uplink symbol, or may be a symbol which may be changed to a downlink symbol or an uplink symbol by terminal-specific control information or scheduling information. The flexible symbol may include a gap guard required in a procedure of switching from downlink to uplink.

A slot format indicator may be concurrently transmitted to a plurality of terminals through a terminal group (or cell) common control channel. In other words, the slot format indicator may be transmitted through a PDCCH that is CRC-scrambled with a terminal-specific identifier (cell-RNTI (C-RNTI)) and another identifier (e.g., an SFI-RNTI). In various embodiments, the slot format identifier may include information on N slots, wherein the value of N may be an integer or a natural number value greater than 0, or may be a value configured in the terminal by the base station via a higher-layer signal from among a set of predefined possible values, such as 1, 2, 5, 10, and 20. The size of slot format indicator information may be configured in the terminal by the base station via a higher-layer signal. An example of a slot format that may be indicated by the slot format indicator is shown in Table 3.

TABLE 3

| Format | Symbol number (or index) within one slot | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | X | U |
| 55 | D | D | D | U | U | U | D | D | X | U | U | U | X | U |
| 56 | D | X | U | U | U | U | D | X | U | U | U | U | U | U |
| 57 | D | D | D | D | X | X | U | D | D | D | X | X | X | U |
| 58 | D | D | X | X | U | U | U | D | X | X | U | U | U | U |
| 59 | D | X | X | U | U | U | U | D | X | U | U | U | U | U |
| 60 | D | X | X | X | X | X | U | D | X | X | X | X | X | U |
| 61 | D | D | X | X | X | X | U | D | D | X | X | X | X | U |

TABLE 3-continued

| | Symbol number (or index) within one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 62-254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

In Table 3, D refers to downlink, U refers to uplink, and X refers to a flexible symbol. According to Table 3, the total number of supportable slot formats is 256. In a current NR system, the maximum size of a slot format indicator information bit is 128 bits, and the slot format indicator information bit is a value that may be configured in the terminal by the base station via a higher-layer signal (for example, dci-PayloadSize).

In various embodiments, the slot format indicator information may include a slot format for a plurality of serving cells, and a slot format for each serving cell may be distinguishable on the basis of a serving cell ID. A combination of slot format indicators (slot format combination) for one or more slots may be included in each serving cell. For example, if the size of the slot format indicator information bit is 3 bits and the slot format indicator information includes a slot format indicator for one serving cell, the 3-bit slot format indicator information may include a total of eight slot format indicators or a slot format indicator combination (hereinafter, a slot format indicator), and the base station may indicate one slot format indicator among the eight slot format indicators via terminal group-common control information (group-common DCI) (hereinafter, slot format indicator information).

In various embodiments, at least one slot format indicator among the eight slot format indicators may include a slot format indicator for a plurality of slots. For example, Table 4 shows an example of the 3-bit slot format indicator information including the slot format of Table 3. Five pieces of information (slot format combination IDs 0, 1, 2, 3, and 4) in the slot format indicator information are slot format indicators for one slot, and the remaining three are information on slot format indicators (slot format combination IDs 5, 6, and 7) for four slots, and may be sequentially applied to four slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0000 |
| 6 | 1111 |
| 7 | 2222 |

The terminal may receive configuration information of the PDCCH for detection of slot format indicator information via a higher-layer signal, and may detect a slot format indicator according to the configuration. For example, the terminal may be configured by, via a higher-layer signal, at least one among a CORESET configuration for detection of slot format indicator information, a search space configuration, RNTI information used for CRC scrambling of DCI in which the slot format indicator information is transmitted, a search space period, and offset information.

Figure 9:
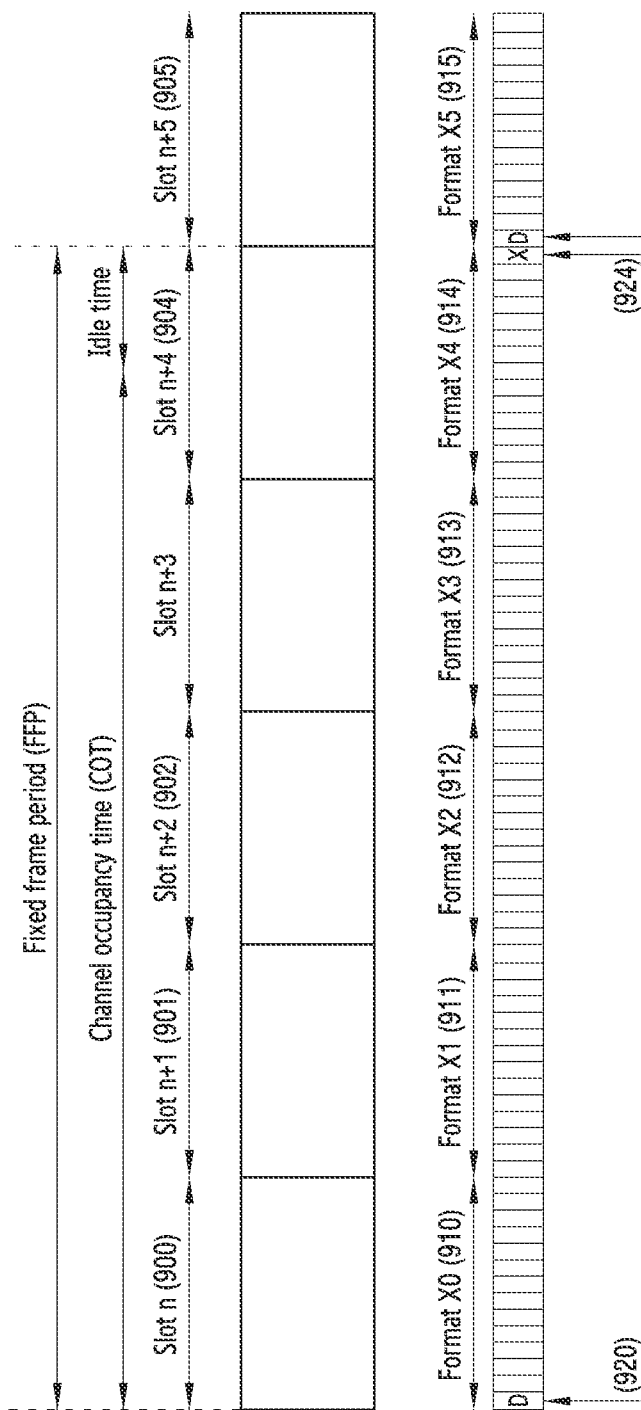
FIG. 9 illustrates a channel occupancy time in the radio communication system according to an embodiment of the disclosure.

FIG. 9 illustrates a channel occupancy time in the radio communication system according to an embodiment of the disclosure.

Referring to FIG. 9, PDCCH areas 920, 922, and 924, in which a terminal should detect slot format indicator information, and the case in which a period of the PDCCH area is two slots are illustrated. In other words, according to the configured PDCCH areas and periods thereof, the terminal may detect DCI, which is CRC-scrambled with a slot format indicator identifier (hereinafter, SFI-RNTI) in the PDCCH areas 920, 922, and 924, in slots n 900, n+2 902, and n+4 904, and may acquire slot format indicators for two slots on the basis of the detected DCI. The detected DCI may include slot format indicator information for two or more slots, and the number of slots for which slot format indicators are to be included in the DCI may be configured via a higher-layer signal. Configuration information on the number of slots, for which slot format indicators are to be included in the DCI, may be included in the same higher-layer signal as that for configuration of the slot format indicator information. For example, referring to FIG. 9, the terminal may acquire slot format indicator information 910 and 911 for slot n 900 and slot n+1 901 in a PDCCH area 920 of slot n 900. In this case, the slot format indicator information 910, 911, 912, 913, and 914 may have the format shown in Table 3.

When the base station transmits slot format indicator information in the unlicensed spectrum, in particular, when the slot format indicator information includes slot format indicators for a plurality of slots, the base station may not be able to determine slot format indicator information for at least one slot according to channel access in the unlicensed spectrum is performed. In other words, in FIG. 9, if the base station performs a channel access procedure for the unlicensed spectrum before slot n 900, determines that channels from slot n 900 to slot n+4 904 are idle channels via the channel access procedure, and occupies and uses the channels, because the base station cannot predict the result of the channel access procedure for the unlicensed spectrum in slot n+5 905, the base station may not determine a slot format indicator of the slot n+5 905. In other words, when the base station transmits the slot format indicator information 914 and 915 for slot n+4 904 and slot n+5 905 in the PDCCH 924, it may be necessary to determine how to indicate the slot format indicator information of slot n+5 905. For example, the base station may indicate that the slot format indicator for a time other than a channel occupancy time is flexible.

Figure 10:
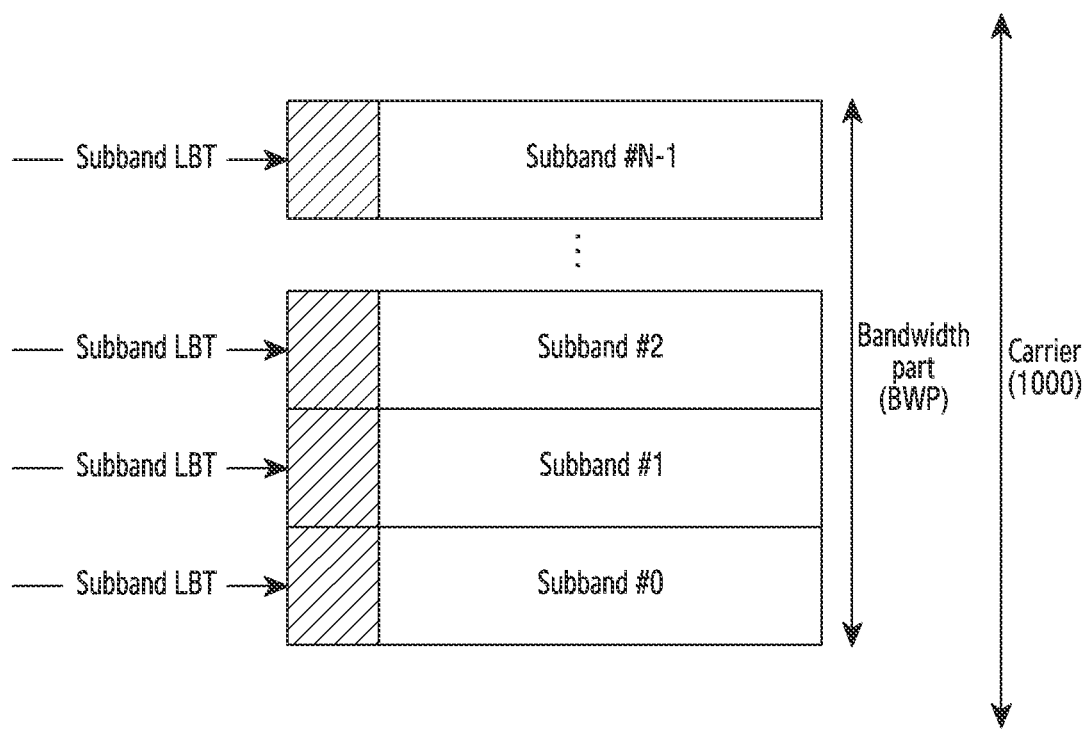
FIG. 10 illustrates an example of the case in which a channel access procedure for a frequency band is performed for each subband in the radio communication system according to an embodiment of the disclosure.

FIG. 10 illustrates an example of the case in which a channel access procedure for a frequency band is performed for each subband in the radio communication system according to an embodiment of the disclosure.

Referring to FIG. 10, in a frequency band of 7 GHz or lower, which is under consideration in the 5G communication system, one carrier may use a frequency band of up to 100 MHz. In this case, one carrier may use a frequency band of up to 400 MHz, in an ultra-high frequency band (mm-Wave) or the frequency band of 7 GHz or higher. The terminal may communicate with the base station using a part of a frequency band (hereinafter, a bandwidth part, BWP) in the frequency band of the carrier, and the bandwidth part may be configured via a higher-layer signal from the base station. The base station and the terminal, which communicate using the unlicensed spectrum, perform a channel access procedure for the unlicensed spectrum before transmitting a signal via the unlicensed spectrum. In the case of an unlicensed spectrum near 5 GHz, the unlicensed spectrum is divided into channels of 20 MHz units, and various communication devices perform channel access procedures for each channel divided by 20 MHz units, and perform communication using the unlicensed spectrum. Accordingly, in the 5G communication system capable of using broadband, when a communication device is to perform communication in an unlicensed spectrum, it is preferable that the communication device perform a channel access procedure in units of 20 MHz. In other words, in the case in which the base station and the terminal perform communication using a bandwidth part 1010 of a carrier 1000, as shown in FIG. 10, if communication is performed via the unlicensed spectrum, the base station and the terminal may divide the bandwidth part 1010 into at least one subband and may perform a channel access procedure for each subband. FIG. 10 illustrates an example of dividing a bandwidth part 1010 into N subbands, and may perform a channel access procedure for each subband. Therefore, because a resource area that enables transmission or reception according to a result of a channel access procedure for each subband is changed, the terminal should receive the result of the channel access procedure performed by the base station for each subband, and therefore the terminal should correctly determine a frequency resource area for uplink/downlink data channel transmission/reception.

Hereinafter, a method for efficiently and accurately notifying a terminal of a result of a channel access procedure for each subband, and a method and device for performing, by the terminal having received the result of the channel access procedure, uplink/downlink data channel transmission/reception, which are proposed by an embodiment of the disclosure, are not limited to the embodiments, and it may be possible to utilize a method and device for more efficiently and accurately communicating with a base station by a terminal, using all or some of the content of one or more embodiments proposed by the disclosure. The following description will be made based on downlink data channel transmission, in which the base station transmits data to the terminal, but various methods proposed in the disclosure may be applied even when uplink data channel transmission, in which a terminal transmits data to a base station, is performed.

Hereinafter, the description of the disclosure proposes a method for transmitting, to a terminal, the result of a channel access procedure performed by a base station for each subband when the base station and the terminal communicate using an unlicensed spectrum, and the disclosure proposes a method for properly receiving a PDSCH by a terminal having received the result of a channel access procedure.

Figure 11:
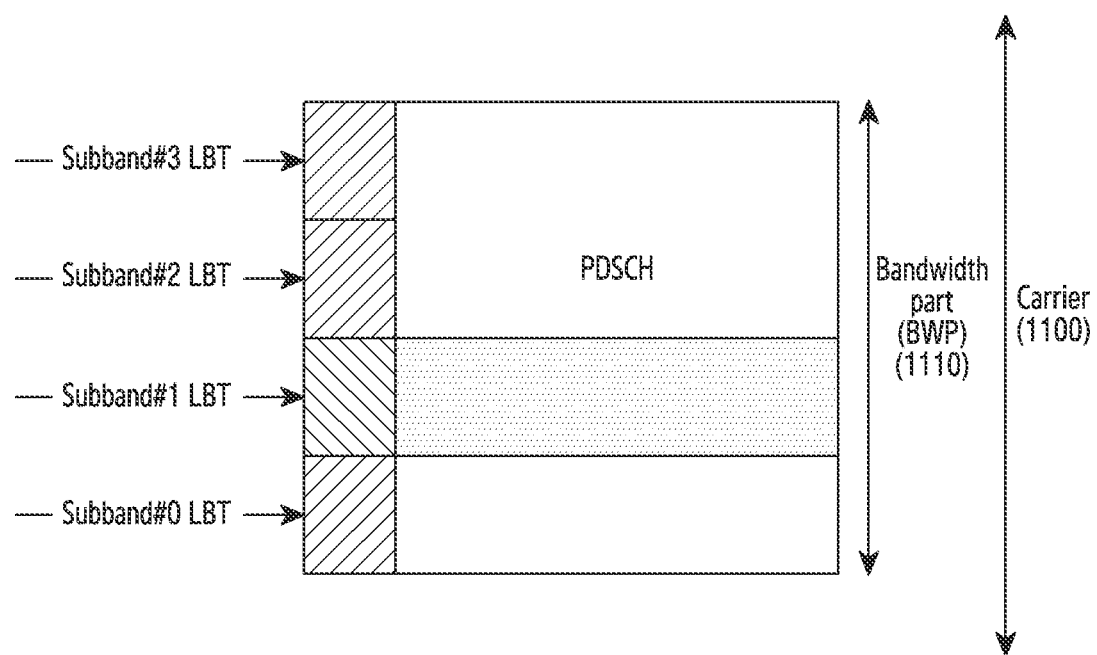
FIG. 11 illustrates an example of the case in which a channel access procedure is performed for each subband of a bandwidth part in the radio communication system according to an embodiment of the disclosure.

FIG. 11 illustrates an example of the case in which a channel access procedure is performed for each subband of a bandwidth part in the radio communication system according to an embodiment of the disclosure.

The base station may divide a bandwidth part into subbands according to a carrier size or a size of the bandwidth part configured in the terminal. According to FIG. 11, an 80 MHz carrier 1100 or a bandwidth part 1110 may be divided into four subbands, and the base station may perform a channel access procedure for each subband. In various embodiments, the size of a subband may be configured, from the base station, for the terminal via a higher signal, and may be equal to the channel size of an unlicensed band including the bandwidth part 1110 or may be a multiple of the channel size of the unlicensed band including the bandwidth part 1110. The size of the subband may be defined on the basis of the size of the bandwidth part or the number of PRBs. For example, the size of the subband may be 20 MHz, which is the channel size of an unlicensed band of 5 GHz, or may be 40 MHz or 80 MHz, which is a multiple of the channel size of the unlicensed band of 5 GHz. As another example, the size of the subband may be defined as the X number of PRBs, wherein a bandwidth corresponding to the X number of PRBs may be equal to or smaller than a bandwidth of 20 MHz which is the channel size of the unlicensed band. Similarly, the size of the subband may be defined as the Y and/or Z number of PRBs corresponding to a bandwidth equal to or less than a bandwidth of 40 MHz or 80 MHz. X, Y and Z values for each bandwidth may be defined in advance between the base station and the terminal.

In various embodiments, the size of at least one subband among subbands included in the bandwidth part 1110 may be different from the size of the remaining subbands. For example, when the size of the carrier 1100 and/or the size of the bandwidth part 1110 is 50 MHz, the bandwidth part 1110 may be divided into three subbands, and the sizes of respective divided subbands may be 20 MHz, 20 MHz, and 10 MHz or may be 10 MHz, 20 MHz, and 20 MHz. The number of subbands and/or the size of the subbands described above are exemplary and various modifications are possible. In other words, when the size of the bandwidth part 1110 is 50 MHz, the bandwidth part 1110 may be divided into a subband of 40 MHz and a subband of 10 MHz. In the above example, the size of each subband may be represented by the number of PRBs.

The base station, having performed the channel access procedure for each subband, may transmit the result of the channel access procedure for each subband to the terminal using a bitmap. For example, in the case of FIG. 11, the result of the channel access procedure for each of four subbands may be transmitted to the terminal via 4-bit bitmap, and the bitmap may be sequentially configured in the order from a subband having a low subband index to a subband having a high subband index, and each bit may represent the result of the channel access procedure performed by the base station for each subband. For example, bit 0 may mean that a subband is not idle, and bit 1 may mean that a subband is idle. The above-described bit values are exemplary, and the bit values may be configured in a reverse manner. In this case, transmission of the result of the channel access procedure for each subband to the terminal may be expressed as an operation of transmitting, to the terminal, information on whether the base station has occupied (bit 1) a subband or not (bit 0), or transmitting, to the terminal, information on whether or not the base station has transmitted (bit 1) a downlink signal via a subband (bit 0). The transmission of the result of the channel access procedure for each subband to the terminal may mean that the base station has transmitted a downlink signal via a subband, wherein the base station transmits to the terminal information on whether the downlink signal is punctured (bit 0) or whether the downlink signal is rate-matched to the subband (or not transmitted) (bit 1). In other words, transmission of the result of the channel access procedure for each subband to the terminal may mean providing the terminal with information for preventing the terminal from receiving a control signal, a control channel, or a data channel in a subband in which the base station has failed in channel access. On the other hand, transmission of the result of the channel access procedure for each subband to the terminal via a bitmap is exemplary, and it is possible for the base station to express a combination of the result of the channel access procedure for each subband as a bit string as shown in Table 5 and transmit one result value thereof to the terminal. If only channel access of continuous subbands is allowed, for example, when channel access using discontinuous subbands, such as subbands #0 and #2, is not allowed, transmitting, in a bit string, a combination of the result of the channel access procedure for each subband to the terminal may minimize the number of bits necessary for information transmission, compared to transmitting the result of the channel access procedure to the terminal via the bitmap.

TABLE 5

| Sub-band indicator | Sub-band index |
| --- | --- |
| 0000 | #0 |
| 0001 | #1 |
| 0010 | #2 |
| 0011 | #3 |
| 0100 | #0, #1 |
| 0101 | #0, #2 |
| 0110 | #0, #3 |
| 0111 | #1, #2 |
| 1000 | #2, #3 |
| 1001 | #0, #1, #2 |
| 1010 | #0, #1, #3 |
| 1011 | #1, #2, #3 |
| 1100 | #0, #1, #2, #3 |
| 1101 | Reserved |
| 1110 | Reserved |
| 1111 | Reserved |

For example, the base station may transmit result information of the channel access procedure performed thereby for the subband on the basis of the cell/group-common DCI. The base station may transmit the result of the channel access procedure for the subband to a plurality of terminals on the basis of cell-common or group-common DCI. Because the result of the channel access procedure by the base station is information that is commonly applied to all of the terminals that have been configured by a bandwidth part including subbands, when the base station transmits the result of the channel access procedure for each subband on the basis of cell-common or group-common DCI, the base station may minimize signaling required for transmitting the information to the terminals. Because the bandwidth part may be different for each terminal, when the base station transmits the result of the channel access procedure for each subband on the basis of the cell-common or group-common DCI, the terminal should classify a subband of which position of the bandwidth part configured in the terminal is related to information on the result of the channel access procedure for each subband, which is commonly transmitted by the base station. Therefore, when the base station transmits a result of the channel access procedure for each subband on the basis of cell-common or group-common DCI, the terminal may be additionally configured by an index of the subband further included in the bandwidth part via an upper signal. In this case, the terminal may be further configured by a maximum number of subbands that may be included in the carrier and/or bandwidth part via the higher signal.

Figure 12:
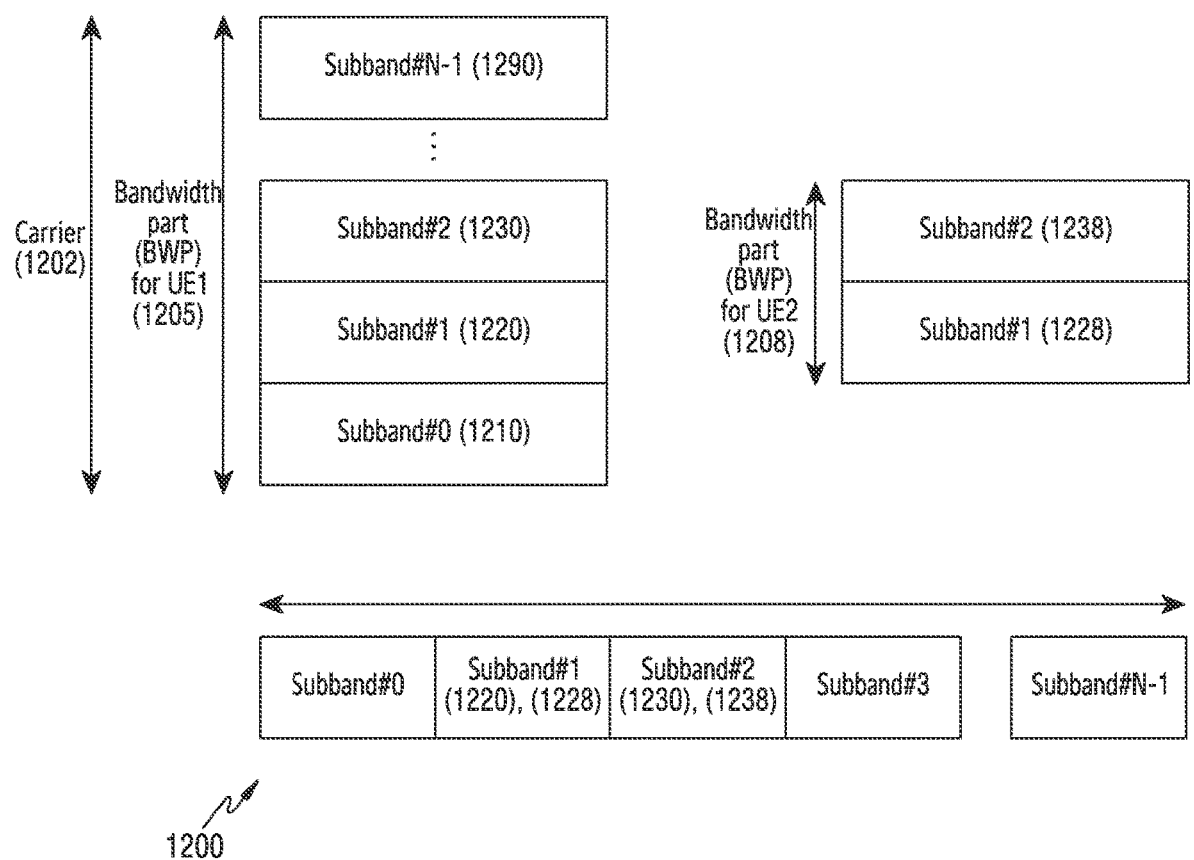
FIG. 12 illustrates a first example of the case in which a terminal having received a result of the channel access procedure performed for each subband receives a physical downlink shared channel (PDSCH) in the radio communication system according to an embodiment of the disclosure.

FIG. 12 illustrates a first example of the case in which a terminal, having received a result of the channel access procedure performed for each subband, receives a PDSCH in the radio communication system according to an embodiment of the disclosure.

Referring to FIG. 12, UE 1 and UE 2 may be configured such that a specific frequency band equal to or within a carrier 1202 of the base station is configured as a bandwidth part 1205 and a bandwidth part 1208. In this case, the sizes of the bandwidth part 1205 and the bandwidth part 1208 configured to UE 1 and UE 2, the start frequency position of the bandwidth part within the carrier 1202, or PRB may be different. In the case shown in FIG. 12, it is assumed that the bandwidth part 1205 of UE 1 is larger than the bandwidth part 1208 of UE 2. If the bandwidth parts 1205 and 1208 are bandwidth parts configured to an unlicensed spectrum cell or the carrier 1202, the bandwidth parts 1205 and 1208 may be divided into a plurality of subbands. For example, according to FIG. 12, the bandwidth part 1205 of UE 1 may be divided into a total of N subbands, and the bandwidth part 1208 of UE 2 may be divided into two subbands. The base station may perform a channel access procedure for the carrier 1202 for each subband resulting from the division, and may transmit the result of the channel access procedure for each subband to the terminals on the basis of the cell/group-common DCI. In this case, the result of the channel access procedure for each subband may include a result for all subbands constituting the carrier 1202 (when performing transmission to the terminal on the basis of the cell-common DCI), or may include the result for the subband of the terminal on the basis of the terminal having the largest number of subbands among terminals included in a group (when performing transmission to the terminal group on the basis of the group-common DCI). The DCI may include an indicator field 1200 for transmitting the result of the channel access procedure for each subband to the terminal, and FIG. 12 shows the result of the channel access procedure of N subbands including bitmaps. Here, two subbands are assigned to UE 2, but a first subband 1228 of UE 2 may be a k-th subband of another UE (a second subband 1220 in a case of UE 1). A second subband 1238 of UE 2 may be an n-th subband of another UE (a third subband 1230 in the case of UE 1). Therefore, when the base station transmits the result of a subband channel access procedure on the basis of the cell/group-common DCI or transmits the result of the subband channel access procedure to terminals having different sizes of bandwidth parts on the basis of the cell/group-common DCI, the terminals may be configured by subband indices included in bandwidth parts configured in the terminals themselves (for example, indices #1 and #2 of subbands included in the bandwidth part 1208 in the case of UE 2) via higher-layer signals as shown in Table 6 of the following embodiment.

TABLE 6

BWP-xxx ::= SEQUENCE
   Subband-ID   SEQUENCE   (SIZE (1..maxSubband)) OF Subband per BWP As another example, the terminal may be configured by according to start positions (a second and a third bit in a field 1200 in the case of UE 2) of information on the terminal or valid information for the terminal in a result field of the channel access procedure for each subband, which is included in the cell/group-common DCI, via a higher-layer signal as shown in Table 7 of the following embodiment.

TABLE 7

BWP-xxx ::= SEQUENCE
    Subband-ID    SEQUENCE    (SIZE (1..maxSubband)) OF Subband per BWP
    positionInDCI INTEGER (0..maxPayloadSize-1)

In various embodiments, the terminal may be further configured by the maximum number (e.g., an N value) of subbands that may be included in the carrier and/or bandwidth part via the higher signal. Accordingly, the terminal may determine the size (e.g., n bits) of the result field of the channel access procedure for each subband included in the cell/group common DCI, may determine information indicating the result of the channel access procedure for the valid subband for each terminal, and may disregard or may not use information (for example, in the case of UE2, information indicating a result of the channel access procedure for a subband except for subband #1 and subband #2 among N subbands) relating to subbands other than the valid subband.

In various embodiments, the base station may divide the carrier and/or the bandwidth part into subbands, and may transmit results of the channel access procedure for bandwidth parts and/or a plurality of carriers to one or more terminals on the basis of the cell/group common DCI as well as transmit the result of the channel access procedure for each subband to one or more terminals on the basis of the cell/group common DCI. The result field of the channel access procedure indicated on the basis of the cell/group common DCI may include carrier indices and/or serving cell indices in ascending order. In other words, the result of the channel access procedure for an index having the lowest carrier index and/or serving cell index may be transmitted to the most significant bit in the result field of the channel access procedure, which is included in the DCI. In addition, the base station may divide one or more carriers and/or bandwidth parts among the plurality of carriers and/or bandwidth parts into subbands, and may transmit the results of the channel access procedure for the subbands to one or more terminals on the basis of cell/group common DCI. The result field of the channel access procedure, which is indicated on the basis of the cell/group common DCI may include carrier indices and/or serving cell indices and subband indices in ascending order. For example, the result field of the channel access procedure, which is indicated on the basis of the cell/group common DCI may include indices in order of subband #0 of carrier #0, subband #1 of carrier #0, subband #0 of carrier #1, subband #1 of carrier #1, and subband #2 of carrier #1.

For example, the base station may transmit result information of the channel access procedure performed thereby for the subband on the basis of terminal-specific DCI.

The base station may transmit the result of the channel access procedure for the subband to a specific terminal on the basis of the terminal-specific DCI. Even when the base station transmits the result of the channel access procedure for each subband on the basis of cell-common or group-common DCI, the terminal-specific DCI may include the result of the channel access procedure for each subband. This is useful for a terminal which has not received the cell/group-common DCI but has received downlink or uplink scheduling information. The size of the bitmap or bit string indicating the result of the channel access procedure for each subband transmitted on the basis of the terminal-specific DCI may vary depending on the number N of subbands included in the bandwidth part configured in the terminal.

Figure 13A:
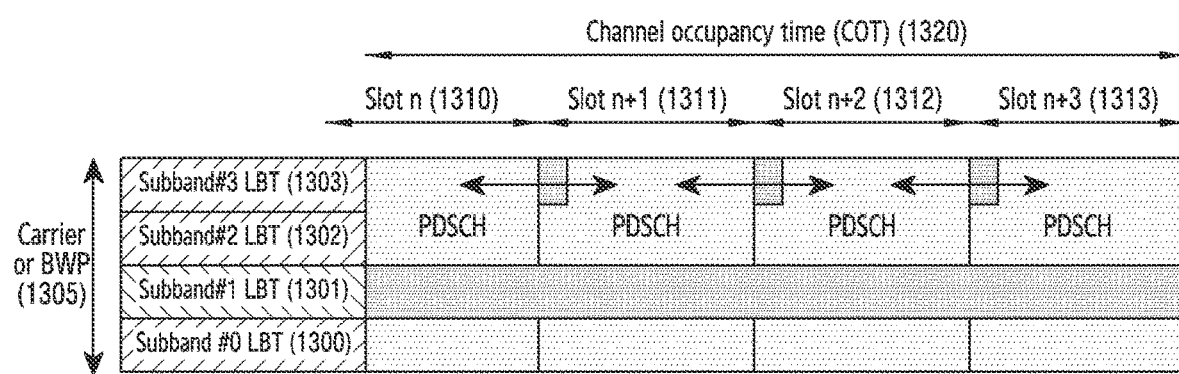
FIG. 13A illustrates a second example of the case in which the terminal having received the result of the channel access procedure performed for each subband receives the PDSCH in the radio communication system according to an embodiment of the disclosure.
Figure 13B:
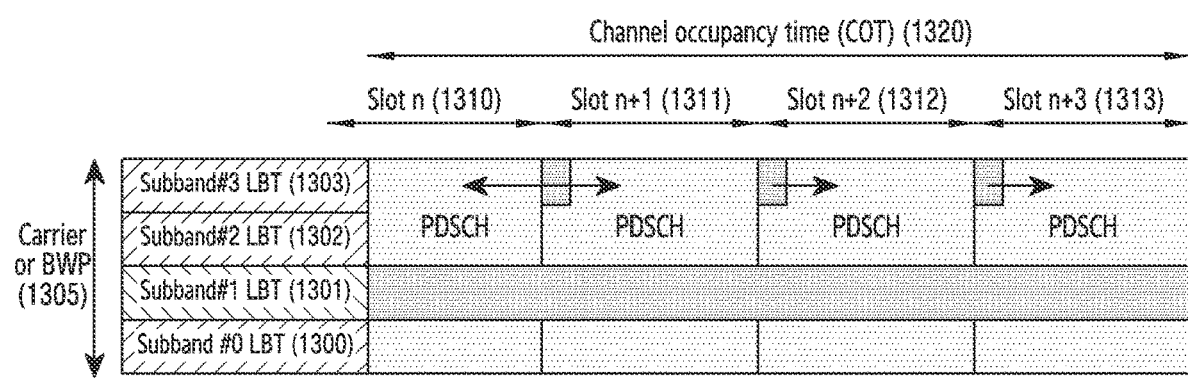
FIG. 13B illustrates a second example of the case in which the terminal having received the result of the channel access procedure performed for each subband receives the PDSCH in the radio communication system according to an embodiment of the disclosure.
Figure 13C:
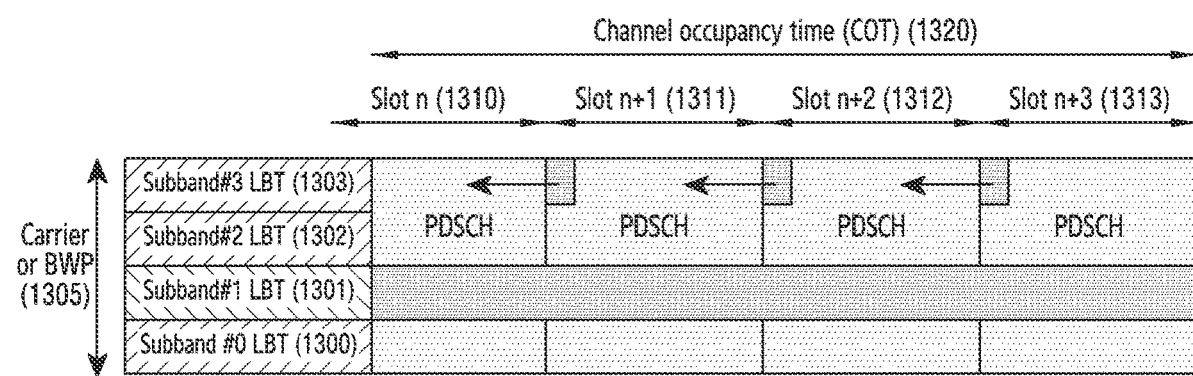
FIG. 13C illustrates a second example of the case in which the terminal having received the result of the channel access procedure performed for each subband receives the PDSCH in the radio communication system according to an embodiment of the disclosure.
Figure 13D:
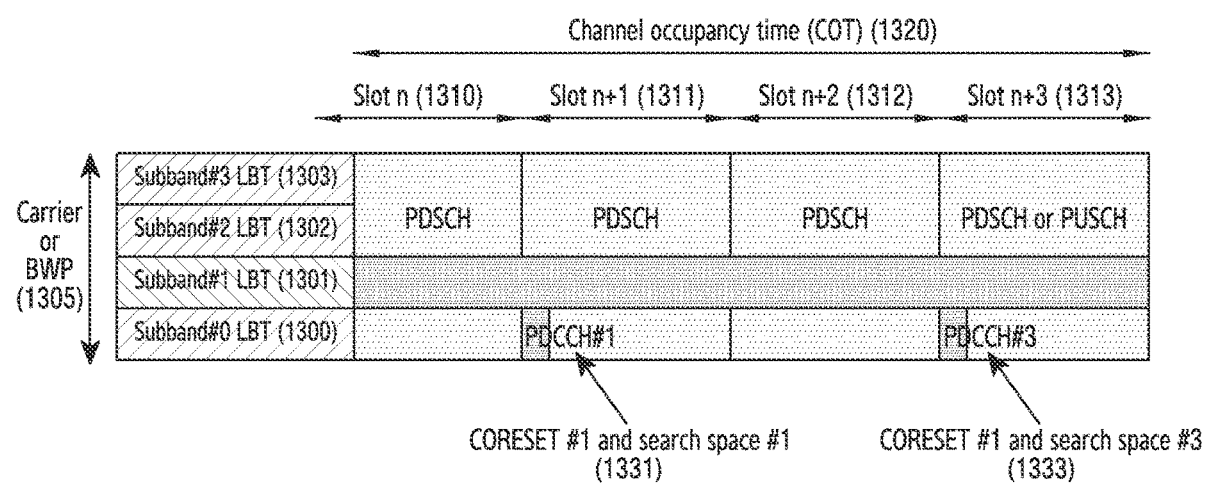
FIG. 13D illustrates a second example of the case in which the terminal having received the result of the channel access procedure performed for each subband receives the PDSCH in the radio communication system according to various embodiments of the disclosure.
Figure 13E:
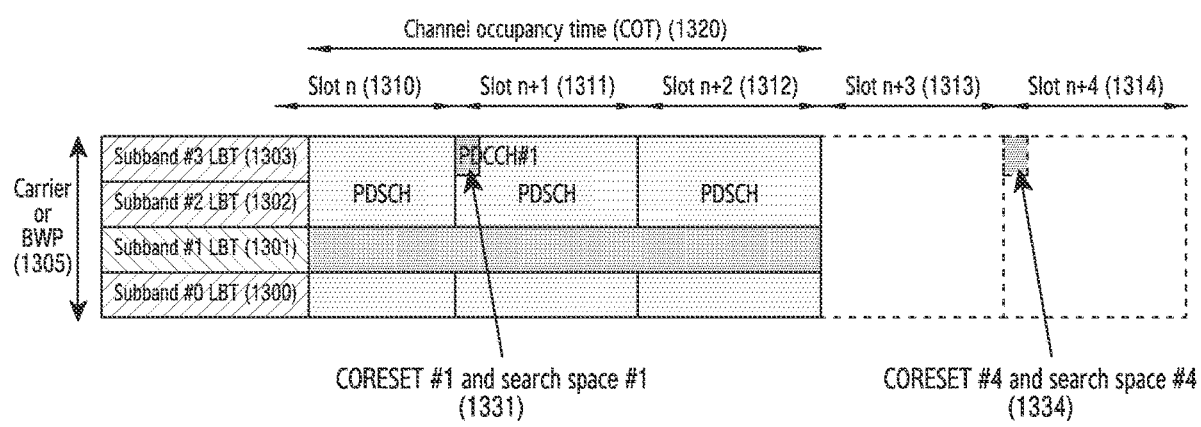
FIG. 13E illustrates a second example of the case in which the terminal having received the result of the channel access procedure performed for each subband receives the PDSCH in the radio communication system according to various embodiments of the disclosure.

FIG. 13A illustrates a second example of the case in which the terminal, having received the result of the channel access procedure performed for each subband, receives the PDSCH in the radio communication system according to various embodiments of the disclosure; FIG. 13B illustrates a second example of the case in which the terminal, having received the result of the channel access procedure performed for each subband, receives the PDSCH in the radio communication system according to various embodiments of the disclosure; FIG. 13C illustrates a second example of the case in which the terminal, having received the result of the channel access procedure performed for each subband, receives the PDSCH in the radio communication system according to various embodiments of the disclosure; FIG. 13D illustrates a second example of the case in which the terminal, having received the result of the channel access procedure performed for each subband, receives the PDSCH in the radio communication system according to various embodiments of the disclosure; and FIG. 13E illustrates a second example of the case in which the terminal, having received the result of the channel access procedure performed for each subband, receives the PDSCH in the radio communication system according to various embodiments of the disclosure.

Referring to FIGS. 13A, 13B and 13C, the base station may perform a channel access procedure for each subband constituting a carrier 1305 or a bandwidth part 1305, and may transmit a downlink signal to the terminal at a channel occupancy time 1320 using subbands 1300, 1302, and 1303, determined to be in an idle state. The channel occupancy (or downlink signal transmission) of the base station may start at any time or symbol in slot n 1310. Therefore, when the base station starts channel occupancy after a time (e.g., every slot first symbol in FIG. 13A, 13B or 13C) configured for the terminal to receive DCI including the result of the channel access procedure for each subband, that is, when the base station starts channel occupancy from a second symbol or a subsequent symbol slot n 1310, the base station may not transmit, in slot n 1310, the result of the channel access procedure for each subband of slot n 1310. Therefore, the base station may transmit the result of the channel access procedure for each subband to the terminal according to the following method.

Method 1: A terminal having received DCI including a result of a channel access procedure for each subband determines that the result of the channel access procedure for each subband is information on a slot in which the DCI is received and information on a slot that is one slot before the slot in which the DCI is received.

An embodiment of method 1 is described in more detail with reference to FIG. 13A.

It is assumed that the base station starts channel occupancy after a time (e.g., a first symbol of each slot in a case of FIG. 13A) configured to receive DCI including the result of the channel access procedure for each subband. When the base station starts channel occupancy from a second symbol of slot n 1310 or a subsequent symbol, the base station may transmit, in slot n+1 1311, the result of the channel access procedure for each subband for slot n 1310. The terminal, having received the DCI including the result of the channel access procedure for each subband in slot n+1 1311, determines that the received result of the channel access procedure for each subband is applied to all of slot n 1310 to slot n+1 1311.

Method 2: Adding a classifier to DCI including a result of a channel access procedure for each subband, wherein the classifier classifies whether the result of the channel access procedure for each subband is information on a slot in which the DCI is received or whether the result of the channel access procedure for each subband is information on a slot that is one slot before the slot in which the DCI is received, thereby determining slot information to which the result of the channel access procedure for each subband, which is received by the terminal from the base station, is applied.

An embodiment of method 2 is described in more detail with reference to FIG. 13A.

It is assumed that the base station starts channel occupancy before a time (e.g., a first symbol of each slot in the case of FIG. 13A) configured to receive DCI including the result of the channel access procedure for each subband. When the base station starts channel occupancy from a first symbol of slot n 1310 or a symbol preceding the same, the base station may transmit, in slot n 1310, the result of the channel access procedure for each subband for slot n 1310. The base station may determine that the result of the channel access procedure for each subband, which is received by the terminal in slot n 1310, is applied to both slot n 1310 and slot n−1 according to method 1. However, because the base station does not actually occupy a channel in slot n−1, the base station may transmit wrong information to the terminal. In this case, the terminal may determine that the base station is not occupying the channel in slot n−1, on the basis of information other than the result of the channel access procedure for each subband, so that it may not be a problem for the base station to use the method 1.

In order to solve the above problem without any information other than the result of the channel access procedure for each subband, in method 2, the DCI including the result of the channel access procedure for each subband may include a classifier that classifies whether the result of the channel access procedure for each subband is information on a slot in which the terminal has received the DCI or information on a slot that is one slot before the slot in which the terminal has received the DCI. Therefore, the terminal may correctly determine the slot to which the result of the channel access procedure for each subband, which is received from the base station, is applied.

Method 3: A terminal having received DCI including a result of a channel access procedure for each subband determines slot information, to which the result of the channel access procedure for each subband, which is received from a base station, is applied, according to channel occupancy time information of the base station.

An embodiment of method 2 is described in more detail with reference to FIG. 13C.

The case where the base station starts channel occupancy after a time (e.g., a first symbol of each slot in a case of FIG. 13B) configured to receive DCI including the result of the channel access procedure for each subband is assumed. When the base station starts channel occupancy from a second symbol of slot n 1310 or a subsequent symbol, the base station may transmit, in slot n+1 1311, the result of the channel access procedure for each subband for slot n 1310. The terminal, having received, in slot n+1 1311, the DCI including the result of the channel access procedure for each subband and DCI including the channel occupancy time information 1320, determines that the received result of the channel access procedure for each subband is, in a first slot of the channel occupancy time of the base station, information on a slot in which the terminal has received the DCI including the result of the channel access procedure for the subband and information on a slot that is one slot before the slot in which the DCI is received. For slots other than the first slot of the channel occupancy time of the base station, the terminal determines that the result of the channel access procedure for each subband is information on the slot in which the DCI including the result of the channel access procedure for each subband is received. As shown in FIG. 13C, the terminal having received the DCI including the result of the channel access procedure for each subband and the DCI including the channel occupancy time information 1320 determines, in the last slot of the channel occupancy of the base station, that the received result of the channel access procedure for each subband is information on the slot in which the terminal has received the DCI including the result of the channel access procedure for each channel and information on the slot that is one slot before the slot in which the DCI is received, and the terminal determines, for slots other than the last slot of the channel occupancy time of the base station, that the result of the channel access procedure for each subband is information on the slot that is one slot before the slot in which the DCI including the result of the channel access procedure for each subband is received.

Method 4: According to channel occupancy time information of a base station, a terminal determines a time to which a result of a channel access procedure for each subband, which is received from the base station, is applied.

An embodiment of method 4 is described in more detail with reference to FIG. 13D.

The terminal may be configured by a search space and/or CORESET for reception of DCI including a result of a channel access procedure for at least one subband and/or carrier, and may attempt DCI detection in the configured CORESET and/or search space. In other words, the terminal may monitor the DCI in the configured CORESET and/or search space. Method 4 is described in more detail with reference to FIG. 13D hereinafter.

The base station may divide the carrier or bandwidth part 1305 into four subbands of 20 MHz, and may perform a channel access procedure for each subband. According to a result of the channel access procedure, the base station may transmit a downlink control signal and/or a downlink control channel to one or more terminals by means of the subbands 1300, 1302, and 1303 which are determined to be in the idle state. The base station may transmit, via at least one subband (e.g., the subband 1300) among the subbands determined to be in the idle state, the result of the channel access procedure for the subband (e.g., subband #0 1300, subband #2 1302, and subband #3 1303 are not occupied, and subband #1 1301 is occupied) to the terminal. The base station may configure, in the terminal, information including at least one of a search space, CORESET, or a position and/or index of a subband in which the result of the channel access procedure for each subband is transmitted, via an upper signal.

The terminal may determine that CORESET and/or a space for reception of LBT result information for each subband includes a resource area 1331 of slot n+1 1311 and a resource area 1333 of slot n+3 1313, on the basis of information including at least one of the search space, CORESET, or the position and/or index of the subband in which the result of the channel access procedure for each subband predefined or configured from the base station via the higher signal is transmitted. The indices of the search space and/or CORESET are exemplary, wherein CORESET

1 and CORESET #3 may be the same or different, and search spaces of CORESET #1 and CORESET #3 (that is, search space #1 and search space #3) may be the same or different from each other. The terminal may attempt to receive and/or detect PDCCH #1 in search space #1 and/or CORESET #1 of slot n+1 1311. The terminal may acquire DCI transmitted through received PDCCH #1, and may determine, on the basis of the DCI, the result of the channel access procedure for each subband, performed by the base station, or whether the base station occupies a channel for each subband, and/or a subband in which the terminal is to receive a downlink control signal or control/data channel.

In various embodiments, when the terminal receives the channel occupancy time information 1320 of the base station so as to know the channel occupancy time information 1320, according to method 4, the terminal may determine that LBT result information for each subband, which is received by the terminal, is valid within a channel occupancy time. In other words, the terminal may determine that the LBT result information for each subband is valid from a time point at which the LBT result information for each subband is received to an end time point (i.e., the last symbol of slot n+3 1313) of the channel occupancy time of the base station. For example, when the terminal having received the DCI including the result of the channel access procedure for each subband in PDCCH #1 1331 of slot n+1 1311 receives the channel occupancy time information 1320 of the base station so as to know the channel occupancy time of the base station, the terminal may determine that the result of the channel access procedure for each subband is valid within the channel occupancy time (slot n+1 1311, slot n+2 1312, and slot n+3 1313) of the base station, and thus receive a downlink control channel, a downlink control signal, and/or a downlink data channel from the base station. In this case, it is assumed that the terminal receives the channel occupancy time information 1320 of the base station in slot n+1 1311 or earlier so as to know the channel occupancy time of the base station.

In various embodiments, when the channel occupancy time of the base station is divided into an occupancy period for downlink signal or downlink channel transmission and an occupancy period for uplink signal or uplink channel transmission, the terminal may determine that the LBT result information for each subband, which is received by the terminal, is valid from a reception time point of the LBT result information for each subband to an end time point of the occupancy period for downlink signal or downlink channel transmission in the channel occupancy time of the base station. For example, in FIG. 13D, when the channel occupancy time of the base station includes the occupancy period (e.g., slot n 1310, slot n+1 1311, and slot n+2 1312) for downlink signal or downlink channel transmission or the occupancy period (e.g., slot n+3 1313) for uplink signal or uplink channel transmission, the terminal may determine that the LBT result information for each subband, which is received by the terminal, is valid from a reception time point of the LBT result information for each subband to an end time point (e.g., the last symbol of slot n+2 1312) of the occupancy period for downlink signal or downlink channel transmission in the channel occupancy time of the base station.

Method 4 may be suitable for the base station to divide the carrier or BWP into a plurality of subbands, and may be suitable for the terminal to determine the validity and/or valid time of the LBT result information for the subbands, but such a situation is not limited. When the base station divides the carrier or BWP 1305 into a plurality of subbands, and transmits a downlink signal or a downlink channel via a part of subbands (e.g., subband #0 1300, subband #2 1302, and subband #3 1303) according to the result of the channel access procedure for each band, the base station may perform the channel access procedure for a subband (e.g., subband #1 1301) that is determined not to be in the idle state. However, in this case, because the base station may also receive the signal, which has been transmitted by the base station via subband #0 1300, subband #2 1302, and subband #3 1303, in subband #1 1301 while the base station is performing the channel access procedure in subband #1 1301, the base station may not correctly perform the channel access procedure for subband #1 1301. In other words, because the result of the channel access procedure for each subband is difficult to be changed within the channel occupancy time of the base station, as in method 4, it may be preferable that the LBT result information for the subband, which is received by the terminal, is assumed to be valid during the channel occupation time of the base station (In other words, from a reception time point of the LBT result information for the subband to an end time point of the channel occupancy time of the base station (e.g., the last symbol of slot n+3 1313)).

In various embodiments, when the terminal has failed to receive or does not know the channel occupancy time information 1320 of the base station, the terminal may determine that the LBT result information for the subband, which is received by the terminal, is valid in a slot including the received CORESET or search space (e.g., slot n+1 1311).

In the above, method 4 has been described as an example in which one carrier or cell includes a plurality of subbands, but method 4 may be applied to a case where a base station and a terminal communicate with each other via a plurality of carriers or cells. For example, the terminal may receive channel occupancy time information and LBT result information of the base station for each carrier or cell. In this case, the terminal may determine a valid time, to which LBT result information for each carrier or cell is applied, by applying method 4 to the LBT result information for each carrier or cell.

Method 5: According to a PDCCH reception time, a terminal determines a time to which a result of a channel access procedure for each subband, which is received from a base station, is applied.

An embodiment of method 5 is described in more detail with reference to FIG. 13D and FIG. 13E.

The terminal may be configured by a search space and/or CORESET for reception of DCI including a result of a channel access procedure for at least one subband and/or carrier, and may attempt DCI detection in the configured CORESET and/or search space. Method 5 is described in more detail with reference to FIG. 13D hereinafter:

The base station may divide the carrier or bandwidth part 1305 into four subbands of 20 MHz, and may perform a channel access procedure for each subband. According to a result of the channel access procedure, the base station may transmit a downlink control signal and/or a downlink control channel to one or more terminals by means of the subbands 1300, 1302, and 1303 which are determined to be in the idle state. The base station may transmit, via at least one subband (e.g., the subband 1300) among the subbands determined to be in the idle state, the result of the channel access procedure for the subband (e.g., subband #0 1300, subband #2 1302, and subband #3 1303 are occupied, and subband #1 1301 is not occupied) to the terminal. The base station may configure, in the terminal, information including at least one of a search space, CORESET, or a position and/or index of a subband in which the result of the channel access procedure for each subband is transmitted, via an upper signal.

The terminal may determine that CORESET and/or a space for reception of LBT result information for each subband includes a resource area 1331 of slot n+1 1311 and a resource area 1333 of slot n+3 1313, on the basis of information including at least one of the search space, CORESET, or the position and/or index of the subband in which the result of the channel access procedure for a subband predefined or configured from the base station via the higher signal is transmitted. The indices of the search space and/or CORESET are exemplary, wherein CORESET #1 and CORESET #3 may be the same or different, and search spaces of CORESET #1 and CORESET #3 (that is, search space #1 and search space #3) may be the same or different from each other. The terminal may attempt to receive and/or detect PDCCH #1 in search space #1 and/or CORESET #1 of slot n+1 1311. The terminal may acquire DCI transmitted through received PDCCH #1, and may determine, on the basis of the DCI, the result of the channel access procedure for each subband, performed by the base station, or whether the base station occupies a channel for each subband, and/or a subband in which the terminal is to receive a downlink control signal or control/data channel.

In various embodiments, when the terminal receives the channel occupancy time information 1320 of the base station so as to know the channel occupancy time information 1320, and the CORESET or search space 1331 and 1333, in which the LBT result information for the subband can be transmitted, is included in the channel occupancy time of the base station, the terminal may determine, according to method 5, that the LBT result information for the subband is valid until immediately before a CORESET or search space configured to receive next LBT result information after the reception time point of the LBT result information for the subband.

In method 5, it is assumed that the terminal receives the channel occupancy time information 1320 of the base station in slot n+1 1311 or earlier so as to know the channel occupancy time of the base station. The terminal may receive the LBT result information for the subband by searching for the CORESET and/or search space 1331 configured in the slot n+1 1311. In method 5, the terminal may determine that the LBT result information for the subband is valid from a slot (e.g., slot n+1 1311) or symbol (e.g., after a last symbol of slot n+1 1311 or a first symbol of slot n+1 1311), at which the LBT result information for the subband has been transmitted, to a symbol immediately before the start (a first symbol in slot n+3 1313 in the case of FIG. 13D) of the search space or CORESET configured to receive the next LBT result information (e.g., resource area 1333 in slot n+3 1313).

In various embodiments, when all or at least one symbol of the CORESET or search space (e.g., a predefined number of symbols or the number of symbols, which is configured by a higher signal, or more), in which the LBT result information for the subband may be transmitted after the reception time point of the LBT result information for the subband, is not included in the channel occupancy time of the base station, or when there is the CORESET and/or search space, in which the LBT result information for the subband may be transmitted at a time other than the channel occupancy time, the terminal may determine that the received LBT result information for the subband is valid in the channel occupancy time of the base station, as in method 4.

Referring to FIG. 13E, the terminal may determine that the LBT result information for the subband is valid until an earlier time point (e.g., slot n+2 1312) among an end time point (e.g., slot n+2 1312) of the channel occupancy time of the base station and a time point immediately before the start of a CORESET or search space 1334 (e.g., a symbol immediately before a first symbol of slot n+4 1314) in which the LBT result information for the subband may be transmitted. In other words, the terminal may determine that the LBT result information for the subband is valid during a minimum number of slots (e.g., 2 slots) or symbols (e.g., 28 symbols) among: the number of slots or symbols (e.g., two slots or 28 symbols) from a slot (e.g., slot n+1) 1311 including the CORESET, in which the LBT result information for the subband is received, or a first symbol or last symbol of the corresponding CORESET to a slot (e.g., slot n+2 1312) or symbol, at which the channel occupancy time of the base station ends; and the number of slots or symbols (e.g., three slots or 42 symbols) from the slot including the CORESET, in which the LBT result information for the subband is received, or the first symbol or last symbol of the corresponding CORESET to a slot immediately before the slot (e.g., slot n+4 1314) including the CORESET configured to receive the next LBT result information or a symbol immediately before a first symbol of the corresponding CORESET. Here, the terminal may determine that the LBT result information for the subband is valid until the slot (e.g., slot n+1 1311) in which the LBT result information for the subband is received.

In various embodiments, when the terminal has failed to receive or does not know the channel occupancy time information 1320 of the base station, the terminal may determine that the LBT result information for the subband is valid at a slot including the CORESET or search space, in which the LBT result information for the subband has been received.

Method 5 may be suitable not only for a case where the base station divides the carrier or BWP into a plurality of subbands and determines the validity of LBT result information for the subbands, but also for a case where the base station determines the validity of information indicating results of the channel access procedure for multiple carriers or multiple BWPs. When the base station performs the channel access procedure for the multiple carriers or multiple BWPs and transmits the information indicating the results of the channel access procedure to the terminal, the channel access procedure for each carrier may be performed independently. In other words, while the base station is transmitting a downlink signal or a downlink channel in carrier #0, the base station may correctly perform the channel access procedure in carrier #1. This is because there is a sufficient protection interval between each of the carriers, and the base station may suppress a signal leaking out of a carrier bandwidth through the filter.

In the above, method 5 has been described as an example in which one carrier or cell includes a plurality of subbands, but method 5 may be applied to a case where a base station and a terminal communicate with each other via a plurality of carriers or cells. For example, the terminal may receive channel occupancy time information and LBT result information of the base station for each carrier or cell. In this case, the terminal may determine a valid time, to which LBT result information for each carrier or cell is applied, by applying Method 5 to the LBT result information for each carrier or cell.

In various embodiments of the disclosure, determining, by the terminal, that the previously received LBT result information for the subband is valid may include determining, by the terminal, that the LBT result information for the subband, which is received by the terminal, is maintained during the channel occupancy time of the base station. This may include determining that the LBT result information for each subband at a slot, in which the LBT result information for the subband is not received, in slots within the channel occupancy time, is the same as the LBT result information for each subband at a slot in which the terminal has received the LBT result information for the subband. In various embodiments, when the terminal acquires pieces of LBT result information relating to the plurality of subbands within the channel occupancy time of the base station and the acquired pieces of LBT result information are different from each other, the terminal may determine that at least one piece of information (e.g., LBT result information for a most recently received subband) among the acquired pieces of LBT result information relating to the plurality of subbands is valid. The terminal may determine that all of the received LBT result information for the plurality of subbands is invalid, and may not use or may ignore the LBT result information for the subband. For example, when the terminal having received the DCI including the result of the channel access procedure for each subband in PDCCH #1 1331 of slot n+1 1311 receives the channel occupancy time information 1320 of the base station so as to know the channel occupancy time of the base station, the terminal may determine that the result of the channel access procedure for each subband is valid during the channel occupancy time (slot n+1 1311, slot n+2 1312, and slot n+3 1313) of the base station, and thus receive a downlink control channel, a downlink control signal, and/or a downlink data channel from the base station.

In various embodiments, the terminal may receive the channel occupancy time information 1320 of the base station on the basis of the same DCI as the DCI, based on which the LBT result information for each subband is transmitted. In this case, a field in which the channel occupancy time information 1320 of the base station is transmitted and a field in which the LBT result information for the subband is transmitted may be distinguished in the DCI. As another example, the terminal may receive the channel occupancy time information 1320 of the base station on the basis of DCI (e.g., DCI transmitted through a PDCCH, in which CRC is scrambled by an RNTI (e.g., a C-RNTI, a configured scheduling-RNIT (CS-RNTI), or a newly defined RNTI (new-RNTI)) that is different from the RNTI (e.g., an SFI-RNTI) of DCI based on which LBT result information for each subband is transmitted) that is different from the DCI based on which the LBT result information for each subband is transmitted.

In the above-described examples, with respect to the result of the channel access procedure for the subband, the case where the base station performs the channel access procedure for the subband and transmits the result of the channel access procedure for the subband has been described. However, various embodiments of the disclosure are not limited in such a case. In other words, various embodiments of the disclosure may be applied even to a case where the base station transmits a result of a channel access procedure for a carrier or cell, or the base station uses a result of a channel access procedure for a subband and/or a carrier or cell.

The first slot or last slot of the channel occupancy time in the disclosure are a first slot or last slot, respectively, in slots in which the base station occupies channels at least at a first symbol among symbols constituting a slot of the channel occupancy time of the base station. Referring to an example of FIG. 13, because the slot n+1 1311 is the first slot, in which the base station occupies the first symbol, in the channel occupancy time 1320 of the base station, the slot n+1 1311 is the first slot of the base station. Similarly, the last slot is slot n+3 1313.

The base station may transmit a downlink signal via a subband resource determined as an idle channel according to the result of the channel access procedure for each subband. The following two schemes are available for transmitting a downlink signal to the terminal by the base station.

Puncturing scheme: The base station may schedule downlink data channel transmission via all resources of a bandwidth part or some resources of the bandwidth part of the terminal. The base station may schedule the data channel transmission without considering the result of the channel access procedure for each subband or by assuming that a subband in an area where a corresponding data channel is transmitted is an idle channel. The scheduling includes a procedure immediately before transmission of a downlink data channel by an actual base station, which includes determining the size of a transport block (TBS), performing resource mapping of data information, and the like. Thereafter, the base station performs a channel access procedure for each subband and transmits a pre-scheduled downlink signal in a subband resource determined as an idle channel according to a result of the channel access procedure, and, in a subband resource determined not to be an idle channel, the pre-scheduled downlink signal may be punctured and may not be transmitted. This is referred to as a puncturing scheme in the disclosure.

Rate-matching scheme: The base station may schedule downlink data channel transmission to the terminal within a subband resource area determined to be an idle channel according to a result of a channel access procedure for each subband, which is referred to as a rate-matching scheme in the disclosure.

As described above, in the scheme of scheduling by rate matching a downlink data channel according to the result of the channel access procedure for each subband, because the base station may schedule the terminal only after obtaining the result of the channel access procedure for each subband, after the base station checks the result of the channel access procedure, accordingly, a delay may occur in scheduling.

Therefore, in the case in which the base station performs the channel access procedure for each subband, downlink data channel scheduling for a slot in which a channel access time (COT) starts may be performed according to the puncturing scheme, and downlink data channel scheduling at a symbol or slot after k symbols or slots on the basis of a slot immediately after a slot, in which the channel access time (COT) starts, or the slot, in which the channel access time (COT) begins, may be performed according to the rate-matching scheme. Here, k is a value that may vary depending on the processing capability of the base station, wherein the base station may, by implementation, configure k and may transmit the configured value of k in a higher-layer signal so as to allow the terminal to recognize the processing capability of the base station.

Referring to FIG. 13, in the case of the base station, which perform a channel access procedure 1300, 1301, 1302, or 1303 for each subband, a downlink data channel for slot n 1310 is scheduled according to the puncturing scheme. According to the result of the channel access procedure 1300, 1301, 1302, or 1303 for each subband in slot n 1310, the base station starts channel access in the subbands 1300, 1302, or 1303, determined to be idle channels, and transmits the downlink data channel via the subband 1300, 1302, or 1303. The downlink data channel in slots n+1 1311, n+2

1312, and n+3 1313 schedules the downlink data channel on the basis of the subbands 1300, 1302, and 1303 determined to be idle channels, according to the rate-matching scheme, and transmits the downlink data channel.

The terminal having received the downlink data channel from the base station should determine whether the downlink data channel corresponds to a slot in which channel access by the base station starts, that is, whether the scheduled downlink data channel is transmitted according to the puncturing scheme or transmitted according to the rate-matching scheme on the basis of the result of the channel access procedure for each subband, and the determination method therefor is as follows.

In a first method, the terminal receives channel access time information transmitted thereto from the base station on the basis of DCI, and determines whether the scheduled downlink data channel is transmitted in the slot in which channel access by the base station starts using the received channel access time information of the base station. If the downlink data channel is transmitted in a slot in which channel access by the base station starts, the terminal determines that the scheduled downlink data channel is transmitted according to the puncturing scheme on the basis of the result of the channel access procedure for each subband. If the downlink data channel is transmitted in a slot immediately after the slot in which channel access by the base station starts, or is transmitted k symbols or k slots thereafter, the terminal may determine that the scheduled downlink data channel is transmitted according to the rate-matching scheme on the basis of the result of the channel access procedure for each subband. The terminal may receive the downlink data channel according to the determined scheme.

In a second method, the base station may also be able to indicate, to the terminal, whether the downlink data channel is transmitted according to the puncturing scheme or is transmitted according to the rate-matching scheme on the basis of the result of the channel access procedure for each subband, via an additional information field of the DCI, in which result information of a channel access procedure for each subband is transmitted to the terminal. The terminal may determine whether the downlink data channel scheduled based on information indicated by the DCI is transmitted according to the puncturing scheme on the basis of the result of the channel access procedure for each subband or is transmitted according to the rate-matching scheme on the basis of the result of the channel access procedure for each subband, and may receive the downlink data channel according to the determined scheme.

In various embodiments, the terminal may not only correctly receive the downlink data channel according to the result of the channel access procedure for the subband, but also may measure and/or report CSI according to information indicating the result of the channel access procedure. In particular, for the terminal, when a part of a reference signal (e.g., a CSI-RS) transmitted from the base station for measurement and/or reporting of the CSI fails to be transmitted according to the result of the channel access procedure for the subband, or when a part of the configured CSI-RS is transmitted in a subband that is determined to be in a state other than an idle state according to the result of the channel access procedure, a method for measuring and/or reporting the CSI by the terminal in a corresponding subband may be required.

In various embodiments, the terminal may receive a CSI report configuration from the base station via a higher signal, and the CSI report configuration may include at least a band (hereinafter, the band may be referred to as a CSI report band) for reporting the CSI and format information of the CSI. The CSI report band is a frequency band, in which the terminal should perform CSI reporting, among activated bandwidth parts, and the CSI report band may be indicated by a plurality of CSI subbands (e.g., 3 to 19 CSI subbands) and may be continuous or discontinuous. For example, when the number of PRBs included in a bandwidth part is from 24 to 72, the terminal may divide the bandwidth part into CSI subbands in units of 4 or 8 PRBs, and one value of 4 or 8 may be configured to the terminal from the base station via a higher signal. As another example, when the number of PRBs included in a bandwidth part is 73 to 144 or 145 to 275, the terminal may divide the bandwidth part into CSI subbands in units of 8 or 16 PRBs or in units of 16 or 32 PRBs, and one value of 8 or 16, or 16 or 32 may be configured to the terminal from the base station via a higher signal.

In various embodiments, when the CSI format is a wideband (e.g., when cqi-FormatIndicator is configured to widebandCQI or widebandPMI), or when a frequency unit (granularity) of the CSI report is a wideband (i.e. in a case of wideband frequency granularity), the terminal should report, to the base station, one CSI (e.g., a single Channel quality information and/or a single PMI) for the entire configured CSI reporting band. As another example, when the CSI format is a subband (e.g., when cqi-FormatIndicator is configured to subbandCQI or subbandPMI) or when the frequency unit of the CSI report is a narrowband (that is, in a case of the subband frequency granularity), the terminal may report, to the base station, a plurality of CSIs in units of CSI subbands in order to report, to the base station, the CSI for the entire configured CSI reporting band.

In various embodiments, when at least one CSI-RS configuration or at least one CSI-RS RE among CSI-RSs configured for CSI reporting of the terminal fails to be transmitted, when CSI-RS transmission is performed via a subband in which the base station has failed to occupy a channel, or when CSI-RS transmission is performed in at least one subband among subbands indicating that the base station has failed to occupy a channel, a method for measuring and/or reporting CSI in the corresponding subband by the terminal may be required.

For example, when the CSI format is a wideband, and at least one CSI-RS configuration or at least one CSI-RS RE among CSI-RSs configured for CSI reporting of the terminal fails to be transmitted, when CSI-RS transmission is performed via a subband in which the base station has failed to occupy a channel, or when CSI-RS transmission is performed in at least one subband among subbands indicating that the base station has failed to occupy a channel, the terminal may not perform CSI reporting, may perform CSI reporting without updating the CSI, or may report, to the base station, the most recently measured CSI. The terminal, in this case, may report CSI predefined with the base station (e.g., CQI having a value of 0 or a value corresponding to 0) for reporting by the terminal.

As another example, when the CSI format is a narrowband, and at least one CSI-RS configuration or at least one CSI-RS RE among CSI-RSs configured for CSI reporting of the terminal fails to be transmitted, when CSI-RS transmission is performed via a subband in which the base station has failed to occupy a channel, or when CSI-RS transmission is performed in at least one subband among subbands indicating that the base station has failed to occupy a channel, the terminal may not perform CSI reporting for the entire CSI reporting band, may perform CSI reporting without updating the CSI, or may report, to the base station, the most recently measured CSI for the entire CSI reporting band. The terminal may not perform CSI reporting for a CSI subband, in which at least one CSI-RS among the CSI-RSs configured for CSI reporting has failed to be transmitted, or a CSI subband included in subbands in which the terminal has failed to occupy a channel, in the CSI reporting band, may perform CSI reporting without updating the CSI for the corresponding CSI subband, or may report, to the base station, the most recently measured CSI for the corresponding CSI subband. The terminal, in this case, may report CSI predefined with the base station (e.g., CQI having a value of 0 or a value corresponding to 0) for reporting by the terminal. The terminal may measure CSI for a CSI subband, in which at least one CSI-RS among the CSI-RSs configured for CSI reporting has failed to be transmitted, or a CSI subband remaining after excluding a CSI subband included in subbands in which the terminal has failed to occupy a channel, in the CSI reporting band, and may report the measured CSI.

Figure 14:
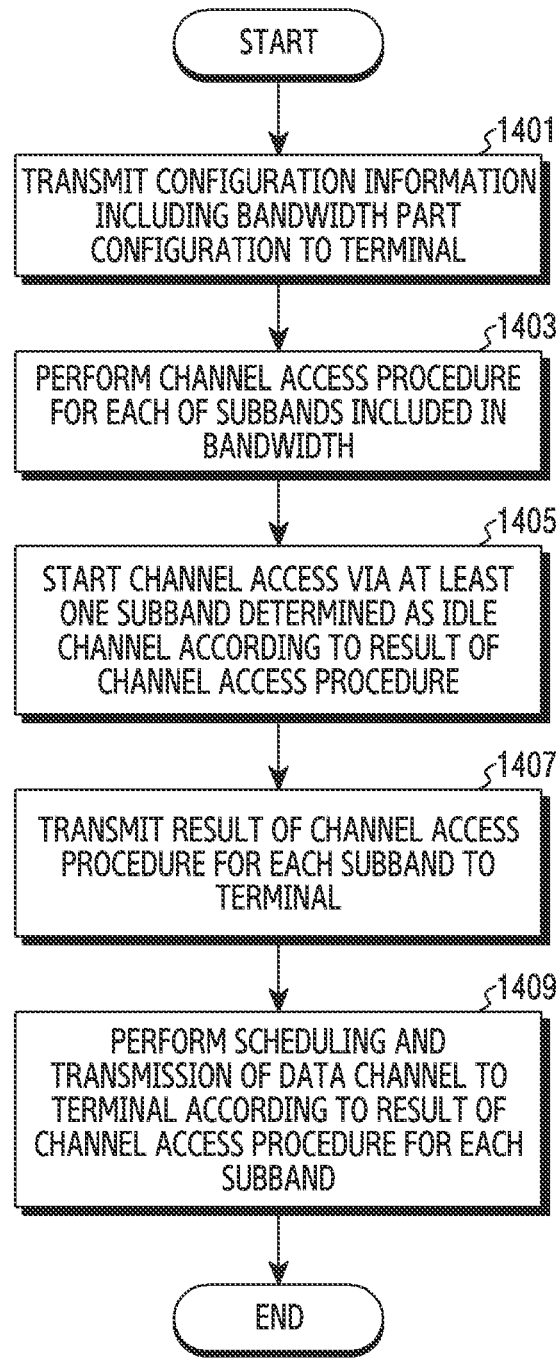
FIG. 14 illustrates a flowchart of a base station in the radio communication system according to an embodiment of the disclosure.

FIG. 14 illustrates a flowchart of a base station in the radio communication system according to an embodiment of the disclosure. FIG. 14 illustrates an operation method of the base station 110.

Referring to FIG. 14, in operation 1401, a base station transmits configuration information including a bandwidth part configuration to a terminal. For example, the base station may configure a bandwidth part for communication with the terminal via an unlicensed spectrum, and the bandwidth part configuration may indicate the configured bandwidth part. The base station may configure, for the terminal, a variable value related to transmission/reception of an uplink/downlink data channel, and the configuration information may include the variable value related to transmission/reception of the uplink/downlink data channel. The configuration information may be transmitted via higher-layer signaling.

In operation 1403, the base station performs a channel access procedure for each of subbands included in the bandwidth part. For example, when the configured bandwidth part is greater than a channel in the unlicensed spectrum (e.g., 20 MHz), the base station may divide the bandwidth part into subbands, and may perform a channel access procedure for each subband.

In operation 1405, the base station starts channel access via at least one subband determined to be an idle channel according to the result of the channel access procedure. For example, the base station may identify at least one subband in an idle state according to the result of the channel access procedure, and may start channel access via the at least one subband.

In operation 1407, the base station may transmit the result of the channel access procedure for each subband to the terminal. For example, the base station may indicate, to the terminal, whether each subband is idle or occupied. In various embodiments, operation 1407 may be performed before operation 1405, or may be performed concurrently with operation 1405.

In operation 1409, the base station may schedule and transmit, to the terminal, a data channel according to the result of the channel access procedure for each subband.

Figure 15:
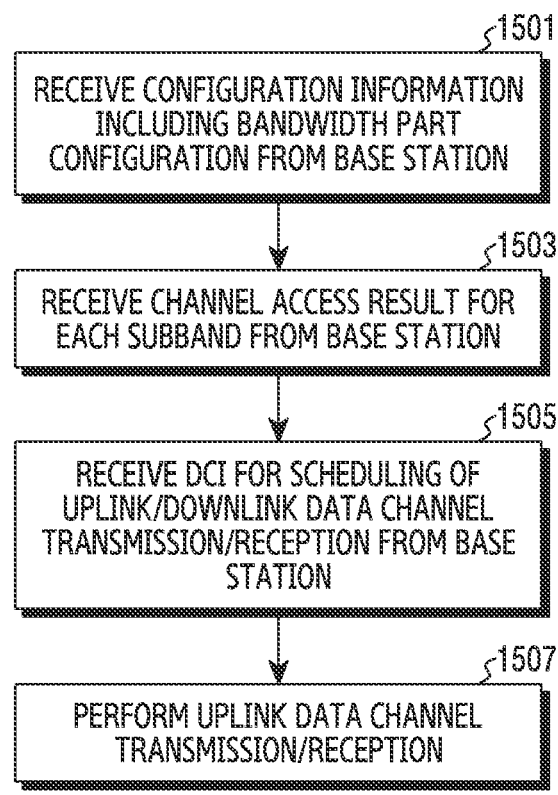
FIG. 15 illustrates a flowchart of a terminal in the radio communication system according to an embodiment of the disclosure.

FIG. 15 illustrates a flowchart of a terminal in the radio communication system according to an embodiment of the disclosure. FIG. 15 illustrates an operation method of the terminal 120.

Referring to FIG. 15, in operation 1501, a terminal receives configuration information including a bandwidth part configuration from a base station. For example, the base station may be configured by a bandwidth part for communication with the base station via an unlicensed spectrum, and the bandwidth part configuration may indicate the configured bandwidth part. The terminal may be configured by a variable value related to transmission/reception of an uplink/downlink data channel, and the configuration information may include the variable value related to transmission/reception of the uplink/downlink data channel. The configuration information may be transmitted via higher-layer signaling.

For example, when the configured bandwidth part is greater than a channel in the unlicensed spectrum (e.g., 20 MHz), it may be determined that the terminal divides the bandwidth part into subbands and performs a channel access procedure for each subband. The terminal may additionally be configured based on whether the base station performs the channel access procedure for each subband or performs the channel access procedure for all bandwidth parts without separate subband division. If the base station performs the channel access procedure for all bandwidth parts without subband division, operation 1501 may be omitted.

In operation 1503, the terminal may receive the result of the channel access procedure for each subband from the base station. For example, when the base station performs the channel access procedure by dividing the bandwidth part into subbands or when the terminal is configured to receive, from the base station, DCI for transmission of the result of the channel access procedure for each subband, the result of the channel access procedure for the subband may be received from the base station.

In operation 1505, the terminal may receive, from the base station, DCI for scheduling of uplink/downlink data channel transmission/reception.

In operation 1507, the terminal may perform uplink data channel transmission/reception.

Figure 16:
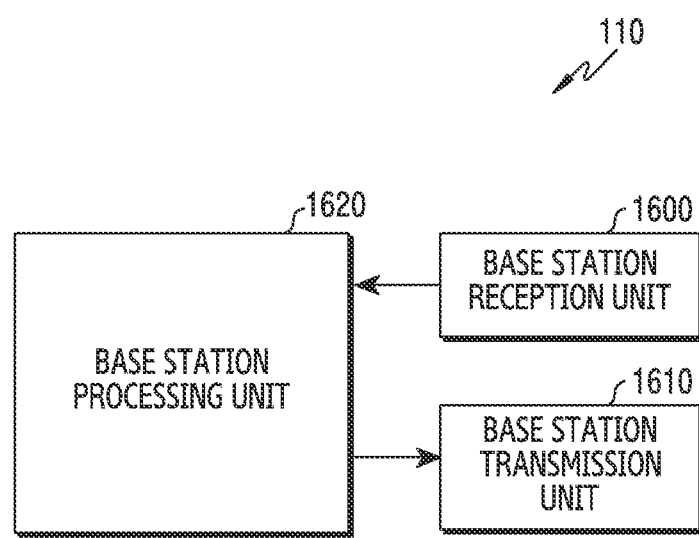
FIG. 16 illustrates an internal structure of the base station in the radio communication system according to an embodiment of the disclosure.

FIG. 16 illustrates the internal structure of the base station in the radio communication system according to an embodiment of the disclosure.

Referring to FIG. 16, the base station of the disclosure may include a base station reception unit 1600, a base station transmission unit 1610 (e.g., a transceiver), and a base station processing unit 1620 (e.g., at least one processor). The base station reception unit 1600, the base station transmission unit 1610, and the base station processing unit 1620 may operate according to the above-described communication method of the base station. However, the elements of the base station are not limited to the above examples. The base station may include more elements or fewer elements than the aforementioned elements. For example, the base station reception unit 1600 and the base station transmission unit 1610 may be implemented as a transmission/reception unit. According to another example, the base station may further include a memory. Further, in the base station, a processor, a transmission/reception unit, and a memory may be implemented in the form of a single chip. At least one processor may be configured. In the embodiment, the term "processor" may be used to indicate the base station processing unit 1620.

"Transmission/reception unit" is a generic term for the base station reception unit 1600 and the base station transmission unit 1610, which may transmit a signal to or receive a signal from the terminal. The signal transmitted to or received from the terminal may include control information and data. To this end, the transmission/reception unit may include an RF transmitter that up-converts and amplifies the frequency of a transmitted signal, an RF receiver that low-noise amplifies a received signal and down-converts the frequency, and the like. However, this is only an embodiment of the transmission/reception unit, and the elements of the transmission/reception unit are not limited to the RF transmitter and the RF receiver. Also, the transmission/reception unit may receive a signal via a radio channel, may output the received signal to the base station processing unit 1620, and may transmit the signal output from the base station processing unit 1620 via the radio channel.

The base station processing unit 1620 may control a series of procedures so that the base station operates according to the above-described embodiment of the disclosure. For example, the transmission/reception unit may receive a data signal including a control signal transmitted by the terminal, and the base station processing unit 1620 may determine the reception result of the data signal and the control signal transmitted by the terminal. Further, the base station processing unit 1620 may perform a channel access procedure for an unlicensed spectrum. For example, the transmission/reception unit may receive signals transmitted to the unlicensed spectrum, and the base station processing unit 1620 may determine whether the unlicensed spectrum is in an idle state by comparing the intensity of the received signal with a predetermined threshold value of a function which is predefined or takes a bandwidth, etc. as parameters. The base station processing unit 1620 may maintain or change a contention window value for the channel access procedure according to a data signal reception result of the terminal, which is received by the transmission/reception unit. If the unlicensed spectrum is determined to be idle, a downlink signal including slot format indicator information may be transmitted through the transmission/reception unit. The transmission/reception unit may transmit a signal including information on an uplink or downlink transmission interval to the terminal within a channel occupancy interval of the unlicensed spectrum determined by the base station processing unit 1620. The base station processing unit 1620 may receive a PUSCH transmitted by the terminal via the base station reception unit 1600 in a PUSCH transmission resource area determined according to the slot format indicator information and PDSCH/PUSCH scheduling information.

The base station processing unit 1620 may execute a program that indicates a channel occupancy time stored in a memory (not shown), so as to transmit configuration information on the PDCCH to a terminal, perform a channel access procedure for channel occupancy of an unlicensed spectrum, and control the memory (not shown) or the transmission/reception unit so as to provide slot format indicator information for at least one slot via the channel occupancy time occupied by the channel access procedure on the basis of the configuration information of the PDCCH. Further, the base station processing unit 1620 may control other elements of the base station to perform the method for indicating the channel occupancy time described above.

The memory (not shown) may store programs and data necessary for operations of the base station. The memory (not shown) may store data or control information included in a signal acquired by the base station. The memory (not shown) may include a storage medium or a combination of storage media, such as a read-only memory (ROM), a random access memory (RAM), a hard disk, a compact disc (CD)-ROM, and a digital versatile disc (DVD).

In various embodiments, the base station reception unit 1600 and the base station transmission unit 1610 may be included in the radio communication unit 210, and the base station processing unit 1620 may be included in the control unit 240.

Figure 17:
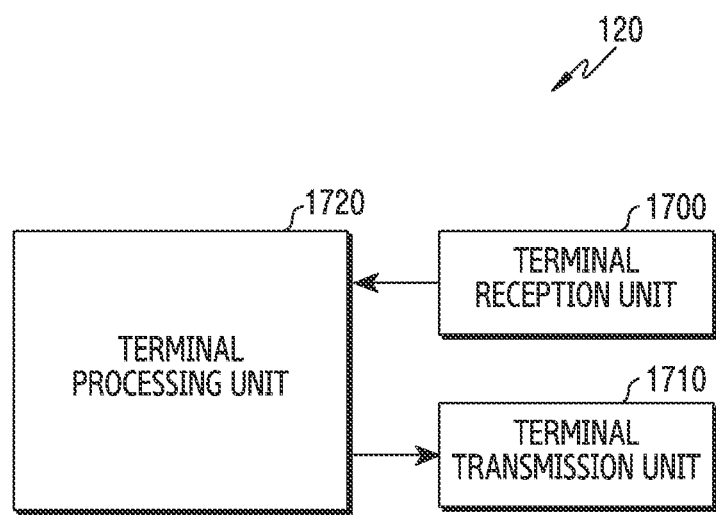
FIG. 17 illustrates an internal structure of the base station in the radio communication system according to an embodiment of the disclosure.

FIG. 17 illustrates the internal structure of the base station in the radio communication system according to an embodiment of the disclosure.

Referring to FIG. 17, the disclosure may include a terminal reception unit 1700, a terminal transmission unit 1710 (e.g., a transceiver), and a terminal processing unit 1720 (e.g., at least one processor). The terminal reception unit 1700, the terminal transmission unit 1710, and the terminal processing unit may operate according to the above-described communication method of the terminal. However, the elements of the terminal are not limited to the above examples. The terminal may include more elements or fewer elements than the aforementioned elements. For example, the terminal reception unit 1700 and the terminal transmission unit 1710 may be implemented as a transmission/reception unit. According to another example, the terminal may further include a memory. Further, a processor, a transmission/reception unit, and a memory 1710 may be implemented in the form of a single chip. At least one processor may be configured. In the embodiment, the processor and the terminal processing unit 1720 may be used to have the same meaning.

The transmission/reception unit is a generic term for the terminal reception unit 1700 and the terminal transmission unit 1710, and may transmit a signal to or receive a signal from the base station. The signal transmitted to or received from the base station may include control information and data. To this end, the transmission/reception unit includes an RF transmitter that up-converts and amplifies the frequency of a transmitted signal, an RF receiver that low-noise amplifies a received signal and down-converts the frequency, and the like. However, this is only an embodiment of the transmission/reception unit, and the elements of the transmission/reception unit are not limited to the RF transmitter and the RF receiver.

Also, the transmission/reception unit may receive a signal via a radio channel and output the received signal to the terminal processing unit 1720, and may transmit the signal output from the terminal processing unit 1720 via the radio channel. The terminal processing unit 1720 may control a series of procedures so that the terminal operates according to the above-described embodiment of the disclosure. For example, the transmission/reception unit may receive a data signal including a control signal, and the terminal processing unit 1720 may determine a reception result of the data signal. Subsequently, when it is necessary to transmit, to the base station, a first signal reception result including data reception at the timing, the transmission/reception unit transmits the first signal reception result to the base station at the timing determined by the terminal processing unit 1720. When the transmission/reception unit receives, from the base station, information on the uplink or downlink transmission interval within the channel occupancy period of the unlicensed spectrum, the terminal processing unit 1720 may re-configure or change a downlink control channel transmission time or period of the terminal, or the terminal may re-configure or change time domain allocation information of the scheduled uplink data channel, and accordingly, the terminal reception unit 1700 may receive the downlink control channel transmitted by the base station. Further, the terminal processing unit 1720 may receive a reception result for the uplink data transmitted from the transmission/reception unit to the base station, and the terminal processing unit 1720 may maintain or change the size of the contention window used in the channel access procedure for unlicensed spectrum signal transmission according to the received result. The terminal processing unit 1720 may receive slot format indicator information transmitted by the base station in the transmission/reception unit, and the terminal processing unit 1720 may re-configure or change the time domain allocation information of the scheduled uplink data channel according to the received slot format indicator information.

According to the disclosure, the terminal processing unit 1720 may configure slot format information, may provide the slot format information, and may receive additional information, such as offset information and valid slot information, from the base station, and may perform a series of operations of acquiring the slot format information on the basis of the received information. That is, the processor 1720 may control other elements of the terminal to perform higher-layer signal reception, SFI reception, DCI reception, a channel access procedure, and the like.

According to the disclosure, the terminal processing unit 1720 may receive, from the base station, one or more pieces of configuration information representing the result of a channel access procedure for each subband. The terminal processing unit 1720 may correctly schedule or receive uplink/downlink data channel via the transmission/reception unit using the result of the channel access procedure configured according to the disclosure.

The terminal processing unit 1720 may execute a program for acquisition of channel occupancy time information stored in the memory so as to receive the PDCCH on the basis of configuration information for the PDCCH from the base station, acquire slot format indicator information within the received PDCCH, and control the memory (not shown) and the transmission/reception unit to determine at least one among a maximum channel occupancy time and a channel occupancy time of the base station on the basis of the slot format indicator information. Further, the terminal processing unit 1720 may control other elements of the terminal to perform the method for acquiring the channel occupancy time information described above.

The memory (not shown) may store programs and data necessary for operation of the terminal. The memory (not shown) may store data or control information included in a signal acquired by the terminal. The memory (not shown) may include a storage medium or a combination of storage media, such as a ROM, a RAM, a hard disk, a CD-ROM, and a DVD.

In various embodiments, the terminal reception unit 1700 and the terminal transmission unit 1710 may be included in the communication unit 310, and the terminal processing unit 1720 may be included in the control unit 330.

Methods according to embodiments stated in claims and/or specifications of the disclosure may be implemented in hardware, software, or a combination of hardware and software.

When the methods are implemented in software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memory including a random access memory and a flash memory, a read-only memory (ROM), an electrically erasable programmable read-only memory (EEPROM), a magnetic disc storage device, a compact disc ROM (CD-ROM), digital versatile discs (DVDs), or other types of optical storage devices, or a magnetic cassette. Alternatively, any combination of some or all thereof may form a memory in which the program is stored. Further, a plurality of such memories may be included in the electronic device.

In addition, the programs may be stored in an attachable storage device which is accessible through communication networks, such as the Internet, Intranet, a local area network (LAN), a wide area network (WAN), and a storage area network (SAN), or a combination thereof. Such a storage device may access a device that performs an embodiment of the disclosure via an external port. In addition, a separate storage device on a communication network may access a device that performs an embodiment of the disclosure.

In the above-described detailed embodiments of the disclosure, an element included in the disclosure is expressed in the singular or the plural form according to a presented detailed embodiment. However, the singular form or plural form is selected for convenience of description suitable for the presented situation, and various embodiments of the disclosure are not limited to a single element or multiple elements thereof. Further, multiple elements expressed in the description may be configured as a single element, or a single element in the description may be configured as multiple elements.

Meanwhile, the embodiments disclosed in the specification and drawings are merely presented to easily describe the technical content of the disclosure and help understanding of the disclosure, and are not intended to limit the scope of the disclosure. That is, it will be obvious to those skilled in the art to which the disclosure belongs that different modifications can be achieved based on the technical spirit of the disclosure. Further, if necessary, the above respective embodiments may be employed in combination. For example, parts of methods proposed in the disclosure may be combined to operate the base station and the terminal. In addition, although the above embodiments have been presented with reference to 5G/NR systems, other modifications based on the technical idea of the embodiments may also be implemented in connection with other systems such as LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

Another aspect of the disclosure is to provide an operation method of a base station in a radio communication system, the method comprising:

transmitting, to a terminal, configuration information comprising including a configuration of a bandwidth part configuration in an unlicensed spectrum, the bandwidth part including a plurality of subbands;

performing a channel access procedure for each of the plurality of subbands included in the bandwidth part;

initiating channel access via at least one subband, among the plurality of subbands, determined to be an idle channel according to a result of the channel access procedure;

transmitting, to the terminal, the result of the channel access procedure for each subband of the plurality of subbands; and transmitting, to the terminal, a data channel according to the result of the channel access procedure for each subband of the plurality of subbands.

Another aspect of the disclosure is to provide an operation method of a terminal in a radio communication system, the method comprising:

receiving configuration information comprising including a configuration of a bandwidth part configuration from a base station in an unlicensed spectrum, the bandwidth part including a plurality of subbands;

receiving a channel access result for each of the plurality of subband subbands of a included in the bandwidth part from the base station;

receiving, from the base station, downlink control information (DCI) for scheduling of uplink/downlink data channel transmission/reception; and performing uplink data channel transmission/reception according to the scheduling of the of the uplink/downlink data channel transmission/reception.

Another aspect of the disclosure is to provide a device of a base station in a radio communication system, the device comprising:

a communication unit transceiver; and
a control unit at least one processor configured to:
control the communication unit, wherein the control unit: transceiver to transmits, transmit to a terminal, configuration information comprising including a configuration of a bandwidth part configuration in an unlicensed spectrum, the bandwidth part including a plurality of subbands;

performs perform a channel access procedure for each of the plurality of subbands included in the bandwidth part;

initiates initiate channel access via at least one subband determined to be an idle channel according to a result of the channel access procedure;

transmits, control the transceiver to transmit to the terminal, the result of the channel access procedure for each subband of the plurality of subbands; and transmits, control the transceiver to transmit to the terminal, a data channel according to the result of the channel access procedure for each subband of the plurality of subbands.

Another aspect of the disclosure is to provide a device of a terminal in a radio communication system, the device comprising:

a communication unit transceiver; and
a control unit at least one processor configured to:
control the communication unit, wherein the control unit:
transceiver to receives receive configuration information comprising including a configuration of a bandwidth part configuration from a base station in an unlicensed spectrum; the bandwidth part including a plurality of subbands, control the transceiver to receives receive a channel access result for each subband of the plurality of subbands of the bandwidth part from the base station;

control the transceiver to receives, receive from the base station, downlink control information (DCI) for scheduling of uplink/downlink data channel transmission/reception; and control the transceiver to performs perform uplink data channel transmission/reception according to the scheduling of the uplink/downlink data channel transmission/reception.

Another aspect of the disclosure is to provide the device as upper mentioned, wherein the at least one processor is further configured to:

control the transceiver to receive a data signal including a control signal; and determine one or more reception results of the data signal including the control signal.

Another aspect of the disclosure is to provide the device as upper mentioned wherein the at least one processor is further configured to control the transceiver to:

transmit a first signal reception result, among the determined one or more reception results, to the base station at a time determined by the at least one processor.

Another aspect of the disclosure is to provide the device as upper mentioned wherein, based on the transceiver receiving, from the base station, information related to an uplink or a downlink transmission interval within a channel occupancy period of the unlicensed spectrum, the at least one processor is further configured to reconfigure:

a downlink control channel transmission time or period of the terminal, or time domain allocation information of a scheduled uplink data channel.

Another aspect of the disclosure is to provide the device as upper mentioned, wherein the at least one processor is further configured to control the transceiver to receive a downlink control channel transmission transmitted by the base station.

What is claimed is:

1. A method performed by a user equipment (UE), the method comprising:

receiving, from a base station, configuration information associated with a slot format indicator (SFI) via a radio resource control (RRC) signaling;

receiving, from the base station, downlink control information (DCI) including information for indicating a channel occupancy duration and information on an availability of resource blocks (RBs) associated with the channel occupancy duration; and identifying the channel occupancy duration that starts from a first symbol of a slot in which the DCI is received, based on the configuration information associated with SFI and the DCI, wherein the DCI is associated with a group of UEs, and
wherein the configuration information associated with the SFI includes position information of the information on the availability of RBs in the DCI.

2. The method of claim 1,
wherein the DCI is received with cyclic redundancy check (CRC) scrambled by SFI—radio network temporary identifier (RNTI), and
wherein the configuration information associated with the SFI further includes information on the SFI-RNTI.

3. The method of claim 1,
wherein the information on the availability of RBs includes a bitmap for a set of subbands configured by a higher signaling,
wherein a subband of the set is available, in case that a bit corresponding to the subband of the bitmap is '1'
wherein a subband of the set is not available, in case that each bit of the bitmap is '0', and
wherein the subband comprises one or more RBs.

4. The method of claim 1,
wherein the DCI further includes index information indicating a slot format combination configured by the configuration information associated with SFI, and
wherein the slot formation combination comprises one or more slot formats, each slot format indicating an arrangement of at least one of a downlink symbol, an uplink symbol, or a flexible symbol in a slot.

5. The method of claim 4, wherein the slot format combination is used in case that the channel occupancy duration is not configured.

6. A method performed by a base station, the method comprising:
- transmitting, to a user equipment (UE), configuration information associated with a slot format indicator (SFI) via a radio resource control (RRC) signaling; and
- transmitting, to the UE, downlink control information (DCI) including information for indicating a channel occupancy duration and information on an availability of resource blocks (RBs) associated with the channel occupancy duration,
- wherein the indicated channel occupancy duration starts from a first symbol of a slot in which the DCI is transmitted,
- wherein the DCI is associated with a group of UEs, and
- wherein the configuration information associated with the SFI includes position information of the information on the availability of RBs in the DCI.

7. The method of claim 6,
- wherein the DCI transmitted with cyclic redundancy check (CRC) scrambled by SFI—radio network temporary identifier (RNTI), and
- wherein the configuration information associated with the SFI further includes information on the SFI-RNTI.

8. The method of claim 6,
- wherein the information on the availability of RBs includes a bitmap for a set of subbands configured by a higher signaling,
- wherein a subband of the set is available, in case that a bit corresponding to the subband of the bitmap is '1',
- wherein a subband of the set is not available, in case that each bit of the bitmap is '0', and
- wherein the subband comprises one or more RBs.

9. The method of claim 6,
- wherein the DCI further includes index information indicating a slot format combination configured by the configuration information associated with SFI,
- wherein the slot formation combination comprises one or more slot formats, each slot format indicating an arrangement of at least one of a downlink symbol, an uplink symbol, or a flexible symbol in a slot, and
- wherein the slot format combination is used in case that the channel occupancy duration is not configured.

10. The method of claim 9, wherein the slot format combination is used in case that the channel occupancy duration is not configured.

11. A user equipment (UE), comprising:
at least one transceiver; and
a controller coupled to the at least one transceiver and configured to:
- receive, from a base station, configuration information associated with a slot format indicator (SFI) via a radio resource control (RRC) signaling,
- receive, from the base station, downlink control information (DCI) including information for indicating a channel occupancy duration and information on an availability of resource blocks (RBs) associated with the channel occupancy duration, and
- identify the channel occupancy duration that starts from a first symbol of a slot in which the DCI is received, based on the configuration information associated with SFI and the DCI,
wherein the DCI is associated with a group of UEs, and
wherein the configuration information associated with the SFI includes position information of the information on the availability of RBs in the DCI.

12. The UE of claim 11,
- wherein the DCI is received with cyclic redundancy check (CRC) scrambled by SFI—radio network temporary identifier (RNTI), and
- wherein the configuration information associated with the SFI further includes information on the SFI-RNTI.

13. The UE of claim 11,
- wherein the information on the availability of RBs includes a bitmap for a set of subbands configured by a higher signaling,
- wherein a subband of the set is available, in case that a bit corresponding to the subband of the bitmap is '1', and
- wherein a subband of the set is not available, in case that each bit of the bitmap is '0', and
- wherein the subband comprises one or more RBs.

14. The UE of claim 11,
- wherein the DCI further includes index information indicating a slot format combination configured by the configuration information associated with SFI,
- wherein the slot formation combination comprises one or more slot formats, each slot format indicating an arrangement of at least one of a downlink symbol, an uplink symbol, or a flexible symbol in a slot, and
- wherein the slot format combination is used in case that the channel occupancy duration is not configured.

15. The UE of claim 14, wherein the slot format combination is used in case that the channel occupancy duration is not configured.

16. A base station, comprising:
at least one transceiver; and
a controller coupled to the at least one transceiver and configured to:
- transmit, to a user equipment (UE), configuration information associated with a slot format indicator (SFI) via a radio resource control (RRC) signaling, and
- transmit, to the UE, downlink control information (DCI) including information for indicating a channel occupancy duration and information on an availability of resource blocks (RBs) associated with the channel occupancy duration
wherein the indicated channel occupancy duration starts from a first symbol of a slot in which the DCI is transmitted,
wherein the DCI is associated with a group of UEs, and
wherein the configuration information associated with the SFI includes position information of the information on the availability of RBs in the DCI.

17. The base station of claim 16,
- wherein the DCI is transmitted with cyclic redundancy check (CRC) scrambled by SFI—radio network temporary identifier (RNTI), and
- wherein the configuration information associated with the SFI further includes information on the SFI-RNTI.

18. The base station of claim 16,
- wherein the information on the availability of RBs includes a bitmap for a set of subbands configured by a higher signaling,
- wherein a subband of the set is available, in case that a bit corresponding to the subband of the bitmap is '1', and
- wherein a subband of the set is not available, in case that each bit of the bitmap is '0', and
- wherein the subband comprises one or more RBs.

19. The base station of claim 16,
- wherein the DCI further includes index information indicating a slot format combination configured by the configuration information associated with SFI, wherein the slot formation combination comprises one or more slot formats, each slot format indicating an arrangement of at least one of a downlink symbol, an uplink symbol, or a flexible symbol in a slot, and wherein the slot format combination is used in case that the channel occupancy duration is not configured.

20. The base station of claim 19, wherein the slot format combination is used in case that the channel occupancy duration is not configured.

* * * * *